(12) United States Patent
Vassiliou et al.

(10) Patent No.: US 7,715,836 B2
(45) Date of Patent: May 11, 2010

(54) DIRECT-CONVERSION TRANSCEIVER ENABLING DIGITAL CALIBRATION

(75) Inventors: Iason Vassiliou, Berkeley, CA (US);
Theodore Georgantas, Athens (GR);
Akira Yamanaka, Union City, CA (US);
Konstantinos Vavelidis, Athens (GR);
Sofoklis Plevridis, Athens (GR)

(73) Assignee: Broadcom Corporation

( * ) Notice: Subject to any disclaimer, the term of this patent is extended or adjusted under 35 U.S.C. 154(b) by 1888 days.

(21) Appl. No.: 10/654,199

(22) Filed: Sep. 2, 2003

(65) Prior Publication Data

US 2004/0106380 A1 Jun. 3, 2004

Related U.S. Application Data

(60) Provisional application No. 60/408,157, filed on Sep. 3, 2002.

(51) Int. Cl.
*H04W 24/00* (2009.01)
*H04B 17/00* (2006.01)
*H03C 1/62* (2006.01)

(52) U.S. Cl. .................. 455/423; 455/67.11; 455/115.1; 455/226.1

(58) Field of Classification Search .................. 455/423, 455/67.11, 115.1, 226.1
See application file for complete search history.

(56) References Cited

U.S. PATENT DOCUMENTS

| 5,732,333 | A | 3/1998 | Cox et al. | |
|---|---|---|---|---|
| 5,905,760 | A | 5/1999 | Schnabl et al. | |
| 6,804,497 | B2 * | 10/2004 | Kerth et al. | 455/88 |
| 7,061,994 | B2 * | 6/2006 | Li et al. | 375/316 |
| 7,110,469 | B2 * | 9/2006 | Shi et al. | 375/295 |
| 2002/0018531 | A1 | 2/2002 | Ratto | |
| 2003/0223480 | A1 * | 12/2003 | Cafarella | 375/219 |
| 2004/0038649 | A1 * | 2/2004 | Lin et al. | 455/130 |
| 2004/0071238 | A1 * | 4/2004 | Khlat et al. | 375/346 |
| 2005/0107059 | A1 * | 5/2005 | Lehning et al. | 455/303 |

OTHER PUBLICATIONS

Cavers, James, "New Methods for Adaptation of Quadrature Modulators and Demodulators in Amplifier Linearization Circuits," IEEE Transactions on Vehicular Technology, vol. 46, No. 3, pp. 707-716, Aug. 1997.

Come, B. et al., "Impact of front-end non-idealities on Bit Error Rate performances of WLAN-OFDM transceivers," Proc. RAWCON 2000, pp. 91-94.

(Continued)

*Primary Examiner*—Matthew D Anderson
*Assistant Examiner*—Wen W Huang
(74) *Attorney, Agent, or Firm*—McAndrews, Held & Malloy, Ltd.

(57) ABSTRACT

A transceiver for transmitting and receiving signals includes a transmitter operative to up-convert baseband signals from a baseband frequency into RF signals at a radio frequency (RF) frequency and output the RF signals, a receiver operative to receive RF signals and down-convert the RF signals into baseband signals having the baseband frequency, and a plurality of calibration paths coupling the transmitter to the receiver. Any of the calibration paths can be selected to be active when calibrating components of the transceiver. Tunable components can use calibration information to optimize transceiver performance.

14 Claims, 12 Drawing Sheets

OTHER PUBLICATIONS

Gray, P.R. et al., "Future Directions in Silicon ICs for RF Personal Communications," Proc. IEEE Custom Integrated Circuits Conf., pp. 83-90, May 1995.

Hajimiri, A. et al., "Design Issues in CMOS Differential LC Oscillators," IEEE J. Solid-State Circuits, vol. 34, No. 5, pp. 717-724, May 1999.

Khorramabadi, H. et al., "Baseband Filters for IS-95 CDMA Receiver Applications Featuring Digital Automatic Frequency Tuning," Proc. IEEE Int. Solid-State Circuits Conf., FA 10.6, pp. 172-173 & 439, Feb. 1996.

Laber, C. A. et al., "A 20-MHz Sixth-Order BiCMOS Parasitic-Insensitive Continuous-Time Filter and Second-Order Equalizer Optimized for Disk-Drive Read Channels," IEEE J. Solid-State Circuits, vol. 28, No. 4, pp. 462-470, Apr. 1993.

Lee, T. H. et al., "5-Ghz CMOS Wireless LANs," IEEE Trans. Microwave Theory and Tech., vol. 50, No. 1, pp. 268-280, Jan. 2002.

Lin, L. et al., "A 1.4 GHz Differential Low-Noise CMOS Frequency Synthesizer using a Wideband PLL Architecture," Proc. IEEE Int. Solid-State Circuits Conf., TP 12.5, pp. 204-205, Feb. 2000.

Liu, T. et al., "5-GHz CMOS Radio Transceiver Front-End Chipset," IEEE J. Solid-State Circuits, vol. 35, No. 1, Dec. 2000.

Magoon, R. et al., "A Single-Chip Quad-Band (850/900/1800/1900 MHz) Direct Conversion GSM/GPRS RF Transceiver with Integrated VCOs and Fractional-N Synthesizer," IEEE J. Solid-State Circuits, vol. 37, No. 12, pp. 1710-1720, Dec. 2002.

Razavi, Behzad, "A 5.2-GHz CMOS Receiver with 62-dB Image Rejection," IEEE J. Solid-State Circuits, vol. 36, No. 5, pp. 810-815, May 2001.

Rofougaran, A. et al., "A 1 GHz CMOS RF Front-End IC for a Direct-Conversion Wireless Receiver," IEEE J. Solid-State Circuits, vol. 31, No. 7, pp. 880-889, Jul. 1996.

Rudell, J. C. et al., "A 1.9 GHz Wide-Band IF Double Conversion CMOS Receiver for Cordless Telephone Applications," IEEE J. Solid-State Circuits, vol. 32, No. 12, pp. 2071-2088, Dec. 1997.

RudeII, J. C. et al., "Recent Developments in High Integration Multi-Standard CMOS Transceivers for Personal Conununication Systems," Proc. Int. Symp. Low Power Elect. Design, pp. 149-154, Aug. 1998.

Steyaert, M. et al., "A Single-Chip CMOS Transceiver for DCS-1800 Wireless Communications," Proc. IEEE Int. Solid-State Circuits Conf., TP 3.3, pp. 3.3-1 to 3.3-10, Feb. 1998.

Terrovitis, M. T. et al. "Noise in Current-Commutating CMOS Mixers," IEEE J. Solid-State Circuits, vol. 34, No. 6, pp. 772-783, Jun. 1999.

Vaucher, C. S. et al., "A Family of Low-Power Truly Modular Programmable Dividers in Standard 0.35 um CMOS Technology," IEEE J. Solid-State Circuits, vol. 35, No. 7, pp. 1039-1045, Jul. 2000.

Zagari, M. et al., A 5-GHz CMOS Transceiver for IEEE 802. I la Wireless LAN Systems, IEEE J. Solid-State Circuits, vol. 37, No. 12, pp. 1688-1694, Dec. 2002.

* cited by examiner

DIRECT-CONVERSION TRANSCEIVER ENABLING DIGITAL CALIBRATION

CROSS REFERENCE TO RELATED APPLICATIONS

The present application claims the benefit of U.S. Provisional Patent Application No. 60/408,157, filed Sep. 3, 2002, entitled, "A Direct Conversion Architecture that Allows Extensive Digital Calibration," which is incorporated herein by reference in its entirety.

FIELD OF THE INVENTION

The present invention relates to transceivers, and more particularly to integrated direct-conversion transceivers that enable the use of digital calibration in order to correct for nonidealities in the system and achieve performance adequate to support high bit rate modulation schemes.

BACKGROUND OF THE INVENTION

One increasingly popular application for wireless systems are wireless local area networks (WLANs) of computer systems. Prominent in the field of home and business, wireless computer networks include the wireless standards known as 802.11. The first standard to be available in commercial products was 802.11b. However, increasing demand for higher capacity in the growing wireless LAN market has led to the introduction of a new generation of WLAN standards using more spectrally efficient modulation techniques, including the IEEE 802.11a standard. The 802.11a standard operates in the 5 GHz unlicensed national information infrastructure (UNII) band (5.15-5.35 GHz, 5.725-5.825 GHz) and is based on orthogonal frequency division multiplexing (OFDM). It supports data rates from 6 Mb/s to 54 Mb/s compared to 1 Mb/s to 11 Mb/s offered by 802.11b. The 802.11a operation around 5 GHz offers the additional advantage of less interference compared to the 2.4 GHz ISM band, where in addition to 802.11b, other band users include microwave ovens, cordless phones, Bluetooth systems, and vintage 802.11 systems.

The advantages of 802.11a come at a cost, however, as OFDM-based systems pose significant implementation challenges requiring low in-band phase noise, high linearity, accurate quadrature matching, closely matched frequency response between the I and Q signal paths, and a large dynamic range. "I" and "Q" are terms referring to "in-phase" and "quadrature," respectively. Ideally, the difference between I and Q signal paths in a transceiver is 90 degrees and the gain is 0 dB. I/Q mismatch refers to the difference in phase and gain between these paths. For example, in order to meet the transmitter error vector magnitude (EVM) specification for the 54 Mb/s mode with a 3 dB implementation margin, system simulation shows that an I/Q mismatch of 1.5°/0.2 dB, an integrated phase noise error of $1°_{rms}$ and operation at 8 dB backoff from the transmitter 1 dB compression point are required.

In addition to tight performance constraints, pricing pressures require that wireless systems be low-cost and highly integrated implementations. To address these needs, the continuous trend towards low-cost integration of wireless systems has driven the introduction of innovative single-chip architectures in CMOS technologies as inexpensive alternatives to the traditional superheterodyne implementations operating at frequencies up to 5 GHz. Many of these single chip architectures are homodyne or direct conversion architectures, which have much fewer components than superheterodyne implementations. For example, in superheterodyne systems, the intermediate frequency (IF) must be high, so that the image is located far from the wanted signal in the frequency spectrum. However, since the IF frequency is high, the filtering of the desired channel (at IF) must also be done at the high frequency. It is difficult or impossible to implement such a filter as an integrated system, so external components are unavoidable. Direct conversion systems do not need such external components.

However, such highly-integrated direct-conversion single-chip architectures suffer from well-known shortcomings that may limit their applicability. These are problems that are also shared by other integrated architectures such as low-IF or wideband-IF, but which can be further aggravated by using CMOS technology.

For example, on the receiver side, the most common problem is the presence of DC offsets, both static and time-varying. In the 802.11a standard, even though a down-converted I/Q signal occupies bandwidth from 150 kHz to 8.3 MHz, the maximum 40 ppm frequency mismatch allowed between transmitter and receiver may shift the signal around DC, thus prohibiting AC coupling without using complex analog frequency correction techniques.

Static DC offset is the result of component mismatches in the signal path and local oscillator (LO) leakage at the inputs of the mixer and the low-noise amplifier (LNA) due to finite on-chip isolation. The leakage signal after mixing with the LO produces a DC component at the baseband input, which depends on the frequency and power of the LO signal. Since static DC offset may be large enough to saturate the baseband receive chain, it needs to be cancelled in the analog domain.

Time-varying DC offsets, in direct conversion receivers, can be the result of self-mixing due to leakage of single-tone (CW) or frequency modulated (FM) interference to the LO port. Similarly, second order distortion applied to CW or FM interference results in DC offset, which varies with the frequency and the power level of the received signal. Since strong interference is not usually present in the 802.11a operating bands, the dominant mechanism causing time-varying DC offsets is self-mixing of the LO signal leaking to the antenna and reflected back from the environment. At the 5 GHz carrier frequency, due to high attenuation and absorbency of reflected signals, such time-varying DC offsets are small compared to the static DC offsets and the overall dynamic range of the receiver (e.g., in the order of 10-50 mV for a 2Vp-p signal), thus it is well known that the time-varying offsets can be tracked and removed by digital signal processing (DSP) after analog-to-digital conversion.

Direct down/up-conversion from/to 5 GHz requires quadrature LO generation at the RF carrier frequency which may result in large I/Q mismatches (including gain and phase mismatches). Other significant problems include sensitivity to flicker noise and pulling of the voltage-controlled oscillator (VCO) by the external or on-chip power amplifier (PA). In addition to these architecture-related non-idealities, higher order QAM-OFDM modulation requires tightly matched baseband I/Q filters on both transmit and receive side to avoid degradation of the overall EVM.

Some of the aforementioned problems and requirements can be mitigated and addressed by careful circuit design and layout, analog auto-calibration techniques or one-time calibration at production testing. However, such approaches may require several design iterations and can be highly sensitive to process variations, thus degrading yield and increasing overall cost, which may cancel the advantages of using CMOS integrated architectures.

Accordingly, what is needed is a low-cost system and method for implementing a highly-integrated direct-conversion transceiver, including CMOS implementations, with the aforementioned problems eliminated or minimized. The present invention addresses such needs.

SUMMARY OF INVENTION

The present invention provides a method and apparatus for a direct conversion transceiver enabling digital calibration.

In one aspect of the present invention, a transceiver for transmitting and receiving signals includes a transmitter operative to up-convert baseband signals from a baseband frequency into RF signals at a radio frequency (RF) frequency and output the RF signals, a receiver operative to receive RF signals and down-convert the RF signals into baseband signals having the baseband frequency, and a plurality of calibration paths coupling the transmitter to the receiver, where any of the calibration paths can be selected to be active when calibrating components of the transceiver.

In another aspect, a method for implementing a transceiver for transmitting and receiving signals includes calibrating components of the transceiver by using a plurality calibration paths of the transceiver, where one of the calibration paths can be selected to be active when calibrating associated components of the transceiver and to be inactive when not calibrating the associated components. The method further includes transmitting radio frequency (RF) signals with a transmitter by up-converting baseband signals having a baseband frequency into the RF signals and outputting the RF signals, and receiving RF signals with a receiver and down-converting the RF signals into baseband signals having the baseband frequency.

In another aspect, a method for calibrating a transceiver includes selecting one of a plurality of available calibration paths on the transceiver to be active, providing a calibration signal to the transceiver, receiving the calibration signal after it has passed through the selected calibration path, and measuring characteristics of the transceiver using the received calibration signal, where the measured characteristics are used in the calibration of the transceiver.

The present invention provides an implementation of a direct conversion architecture for both the receive and transmit path of a communications transceiver that allows the use of digital calibration in order to achieve performance adequate to support high bit rate modulation schemes. The transceiver, system architecture, and methods for calibration of the present invention can use overall system resources in the calibration to correct nonidealities in analog components of a direct conversion system or other transceiver system.

DETAILED DESCRIPTION OF PREFERRED EMBODIMENTS

The present invention relates to transceivers, and more particularly to integrated direct conversion transceivers that allow for the use of digital calibration in order to achieve performance adequate to support high bit rate modulation schemes. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiments shown but is to be accorded the widest scope consistent with the principles and features described herein.

Embodiments and examples of the present invention are described below. While particular applications and methods are explained, it should be understood that the present invention can be used in a wide variety of other applications and with other techniques within the scope of the present invention.

Figure 1:
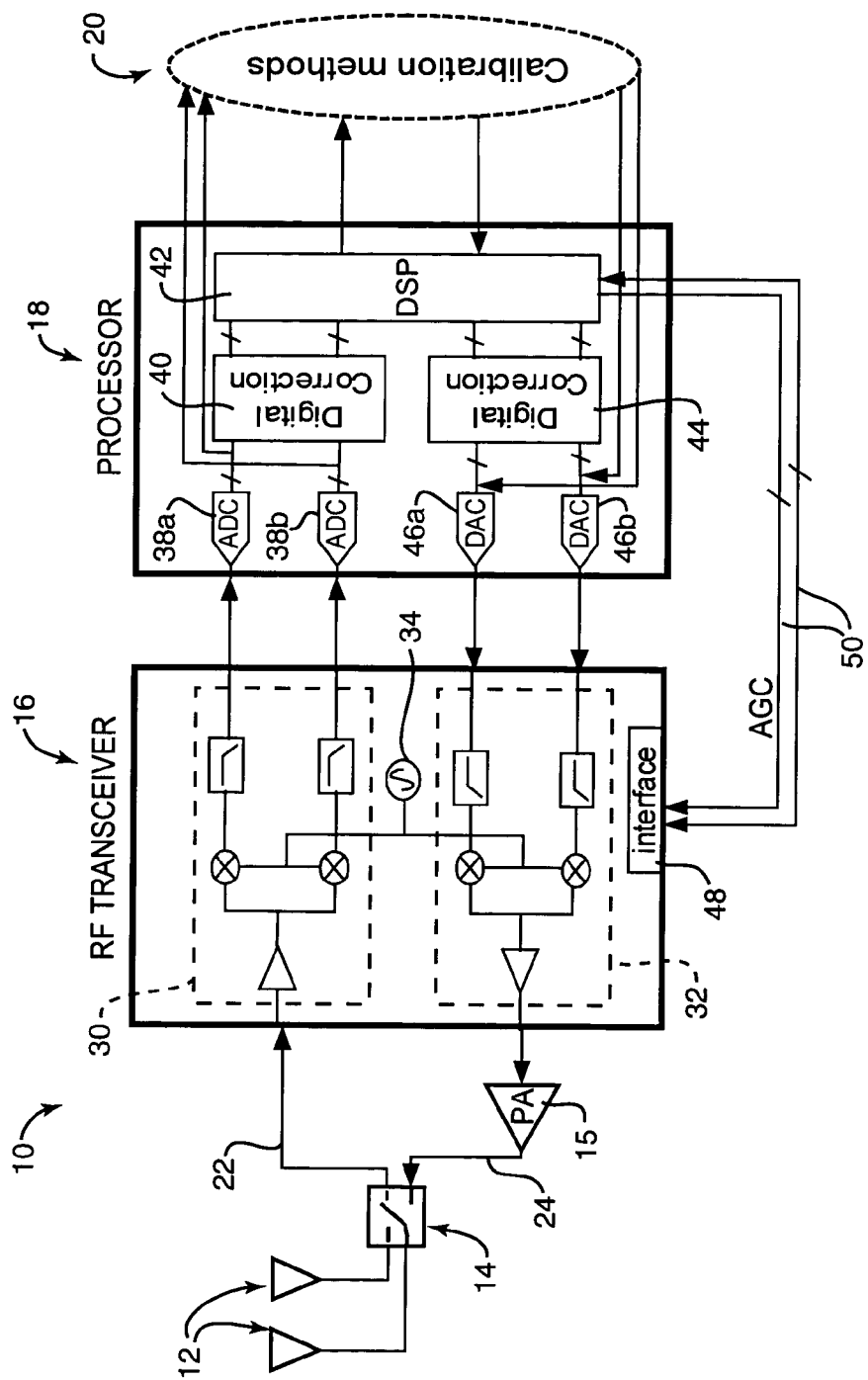
FIG. 1 is a block diagram illustrating an overall system architecture for a direct conversion transceiver and calibration processor of the present invention.

FIG. 1 is a block diagram of an overall system architecture 10 for the present invention. System 10 includes one or more antennas 12, a transfer switch 14, a radio frequency (RF) transceiver 16, a companion baseband processor 18, and calibration methods 20.

Antennas 12 are used to receive a transmitted signal from the air, and to transmit a signal to this air channel. For example, in a wireless LAN environment, a different computer may be transmitting data via wireless transmission, which is then received by one or more antennas 12. Or, the computer to which the antennas 12 are coupled can transmit a signal via antennas 12, which is received by a different antenna, computer or device. Other types of wireless devices can also use one or more antennas 12 which are also suitable for use with the present invention. A transfer switch 14 can be coupled to the antennas 12 and is used to switch between an input port 22 and an output port 24. The transfer switch 14 can be a double-pole double-throw (DPDT) switch, or a combination of switches or switches and diodes performing the same functionality. Typically, the received signal is filtered by one or more radio frequency (RF) filters (not shown) before being provided at the receiver input 12.

The input 22 and output 24 are connected to RF transceiver 16 of the present invention, which includes a receiver component 30, a transmitter component 32, and a frequency synthesizer 34. The receiver component 30 receives the signals from the antennas 12 and processes the signals to allow the desired data to be retrieved from the signals. Processing includes frequency translation to a low intermediate frequency (IF) or baseband, and filtering of unwanted interference from the useful signal. The transmitter component 32 converts a signal formulated by the baseband processor 18 (or other processor) to a form in which it can be transmitted by the antennas 12. Frequency synthesizer 34 generates the reference frequency (LO) signals needed for modulation and demodulation in the transceiver 16. In one described embodiment, transceiver 16 is provided on a single integrated circuit chip, an integrated solution allowing it to be cheaply manufactured. RF transceiver 16 is described below in greater detail with respect to FIG. 2.

In one application for the present invention, transceiver 16 can be implemented as a direct conversion radio transceiver. This embodiment can implement the radio part of the PHY (physical) layer for an 802.11a WLAN system, for example, or other wireless LAN or communication system. For example, CMOS can be used for a single-chip implementation. Many of the problems that typically apply to integrated CMOS or other similar integrated technology in direct conversion high frequency transceiver applications are minimized in the present invention through the use of calibration techniques and overall system design.

Baseband processor 18 is coupled to RF transceiver 16. Processor 18 can be any type of processor, including a microprocessor, application-specific integrated circuit (ASIC), or other type of controller. Processor 18 can be a general purpose processor that performs other tasks and functions for the device in which the system 20 is included in addition to the functions needed for the present invention. For example, processor 18 can be a controller or processor in a wireless network card, or a general microprocessor in a computer that includes a wireless network card using the present invention. Alternatively, processor 18 can be specifically provided for the present invention, and in some embodiments can be included with transceiver 16, e.g. on the same integrated circuit chip. One important feature of some embodiments of the present invention is that the functionality of the processor 18 needed for the present invention can be implemented using free resources of an existing processor, such as a host processor, and has little impact on the computational resources of such a processor.

An important function of the processor 18 for the present invention is the compensation of non-idealities of the transceiver 16 using computing resources of the processor 18 and by calibrating components of the transceiver. The baseband processor 18 receives a down-converted received signal from the receiver component 30 of the transceiver 16, where the signal has been separated into its in-phase (I) and quadrature (Q) forms. The received signal is provided to analog-to-digital converters (ADCs) 38a and 38b, where ADC 38a receives the I signal and ADC 38b receives the Q signal.

Figure 1A:
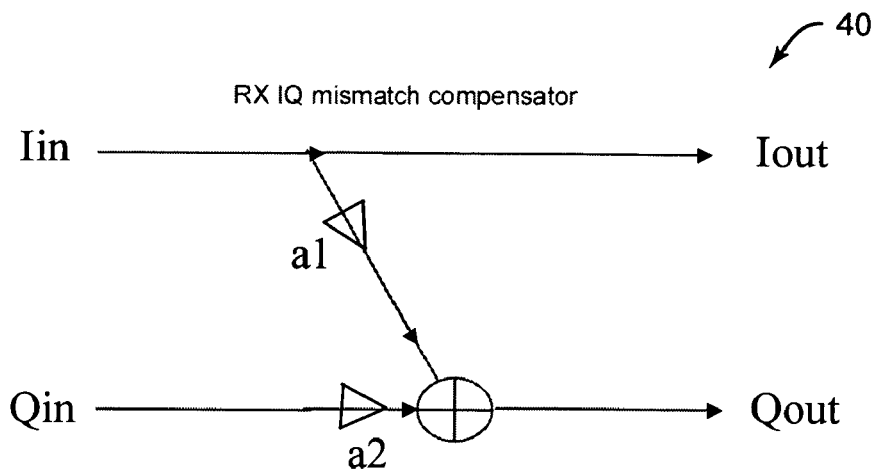
FIGS. 1a and 1b are schematic diagrams illustrating the operation of digital correction blocks used in the present invention for compensating for LO leakage and I/Q mismatch.
Figure 8:
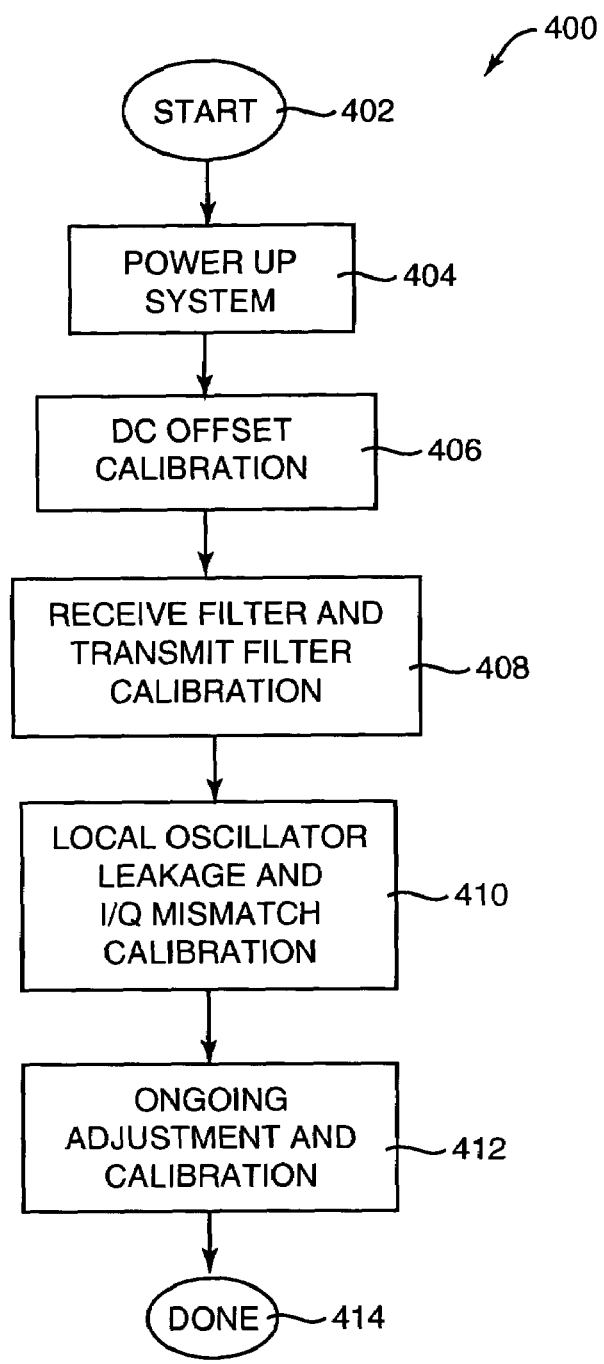
FIG. 8 is a flow diagram illustrating a calibration method of the present invention for the transceiver of FIGS. 1 and 2.

The digital outputs of the ADCs 38a and 38b are provided to a digital correction block 40, which performs real-time I/Q mismatch correction (post-distortion) by using the coefficients (calibration parameters) computed during an initial calibration cycle (see FIG. 8). FIG. 1a illustrates a schematic representation of the digital post-distortion correcting function of correction block 40. Block 40 receives an Iin signal and a Qin signal. To compensate for receiver I/Q mismatch, the block 40 multiplies a parameter a1 with the Iin signal and multiplies a parameter a2 with the Qin signal, and adds these two products together to produce the corrected Qout signal. The Iout signal is simply the Iin signal. Calibration methods 20, residing either in the DSP 42, or on the host or other processor (if separate), compute the coefficients a1 and a2 ("calibration parameters") for the correction block 40 during the calibration cycle described with reference to FIG. 8.

The digital correction block 40 provides the I and Q data to a digital signal processor (DSP) 42, which performs the rest of the functionality of the PHY and MAC (media access control) communication layers (e.g., communicating with other processors and/or functions of a host computer or device. This functionality can be implemented entirely within the DSP processor 42, be partitioned between a processor (such as an ASIC) and a general processor, or reside totally in a general (e.g., host) processor. The DSP 42 can be a processor on the processor chip 18, or some other processor used to implement the calibration methods described herein. In receive mode, DSP 42 receives corrected digital data from the digital correction block 40, representing signals received by the transceiver 16, for digital demodulation for recovery of the original bits of information.

Figure 1B:
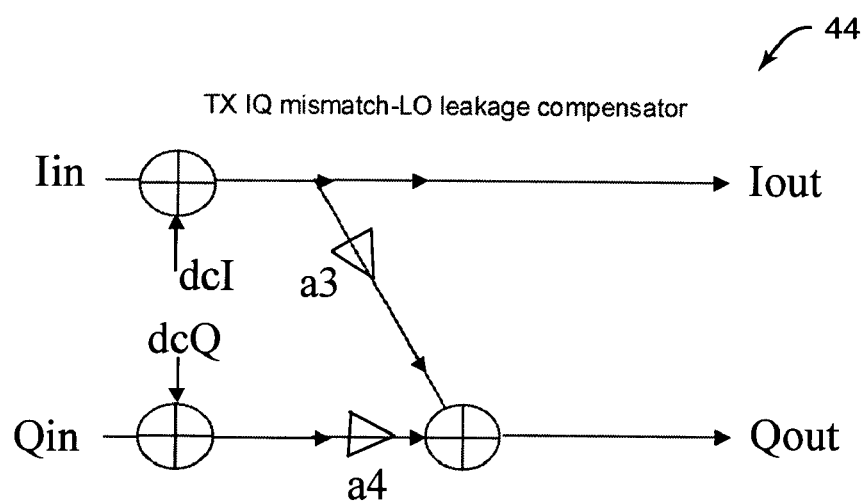

In transmit mode, when the DSP 42 has, data to be transmitted, the data is corrected in correction block 44, which performs real-time I/Q mismatch correction (pre-distortion) by using the coefficients (calibration parameters) computed during an initial calibration cycle (see FIG. 8). FIG. 1b illustrates a schematic representation of the digital pre-distortion correcting function of correction block 44. Block 44 receives an Iin signal and a Qin signal. To compensate for LO leakage, the block 44 adds a constant dcI to the Iin signal, and adds a constant dcQ to the Qin signal. To compensate for transmitter I/Q mismatch, the block 44 multiplies the Iin sum (Iin+dcI) by a parameter a3, multiplies the Qin sum (Qin+dcQ) by a parameter a4, and adds these two products together to produce the corrected Qout signal. The Iout signal is the Iin sum (Iin+dcI). Calibration methods 20 compute the coefficients a3, a4, dcI and dcQ (calibration parameters) for the correction block 44 during the calibration cycle described with reference to FIG. 8.

Correction block 44 sends the I data to digital-to-analog controller (DAC) 46a and sends the Q data to DAC 46b. DACs 46a-b convert the digital data into I and Q analog signals which are provided to the transmitter 32 of transceiver 16. In one embodiment, DACs 46a-b can be dual 10-bit 40 MHz DACs, but may be any suitable type in other embodiments.

DSP 42 also provides programming signals 50 for the RF transceiver 16, which can include (but are not limited to) real time automatic gain control (AGC) signals, and signals for programming the frequency synthesizer 34, programming the correction DC offset for the DC offset correction DACs 120 and 122 of the receiver (see FIG. 2), programming the cutoff for the analog filters 132, 134, 210, 212 (see FIG. 2), and programming the chip into different states or calibration modes as described below (see FIG. 8). In the described embodiment, a digital interface 48 of the transceiver 16 receives these signals which can include, for example, a 7-bit AGC control line and a 3-wire interface for all other programming as well as real-time signals for receiver and transmitter switching. The programming signals 50 allow the processor 18 to control loop-back paths on the transceiver 16 so that the processor can send calibration signals (stimuli) to the transceiver and to receive responsive signals from the transceiver based on the calibration signals, i.e., as if the transceiver has received the calibration signals wirelessly. This enables the measurement of analog imperfections of the transceiver 16 during the calibration cycle and allows the processor 18 to make adjustments, also using the programming signals 50, to components in the transceiver to minimize or compensate for problems, such as I/Q mismatches, baseband filter cutoff frequency mismatch, DC offset, etc. The programming signals 50 can control the calibration paths needed for DC offset calibration, filter tuning, I/Q mismatch calibration, and LO leakage calibration, and can also be used for tuning of the frequency synthesizer 34. For example, processor 18 preferably has the capability of real-time digital pre-distortion and post-distortion in blocks 44 and 40, respectively, which is needed for compensation of transmitter and receiver I/Q mismatch and transmitter local oscillator (LO) leakage. These aspects of the present invention are described in greater detail below.

Baseband processor 18 can be implemented in a variety of different embodiments. The functions of processor 18 shown in FIG. 1 are common in many types of microprocessors and other types of processors, or can exist in specialized processors (e.g., ASICs), such as for wireless LAN applications in such an embodiment.

Calibration methods 20 calibrate the transceiver 16 as described herein by measuring characteristics of transceiver components based on received calibration signals by and computing the necessary correction parameters for the calibration of the transceiver 16 to correct any analog imperfections in the circuits. These methods can be implemented by the processor 18 in some embodiments (such as by DSP 42), for example as program instructions or code (software or firmware) stored in memory or other storage device (magnetic disk, CD-ROM, etc.), or by hardware (logic gates, etc.), or by a combination of hardware and software. In other embodiments, the calibration methods can be implemented and performed by a general purpose processor, such as the host processor of a computer that includes a network card or component holding the system 20, or by a different processor in communication with the processor 18 or transceiver 16. The calibration methods 20 are described in greater detail below with respect to FIG. 8.

The present invention thus enables the use of digital calibration in order to correct for nonidealities in the analog front-end of a transceiver by using overall system resources and achieve performance adequate to support high bit rate modulation schemes. In some embodiments, aspects of the present invention can also be used in non-direct-conversion transceivers, as appropriate.

Figure 2:
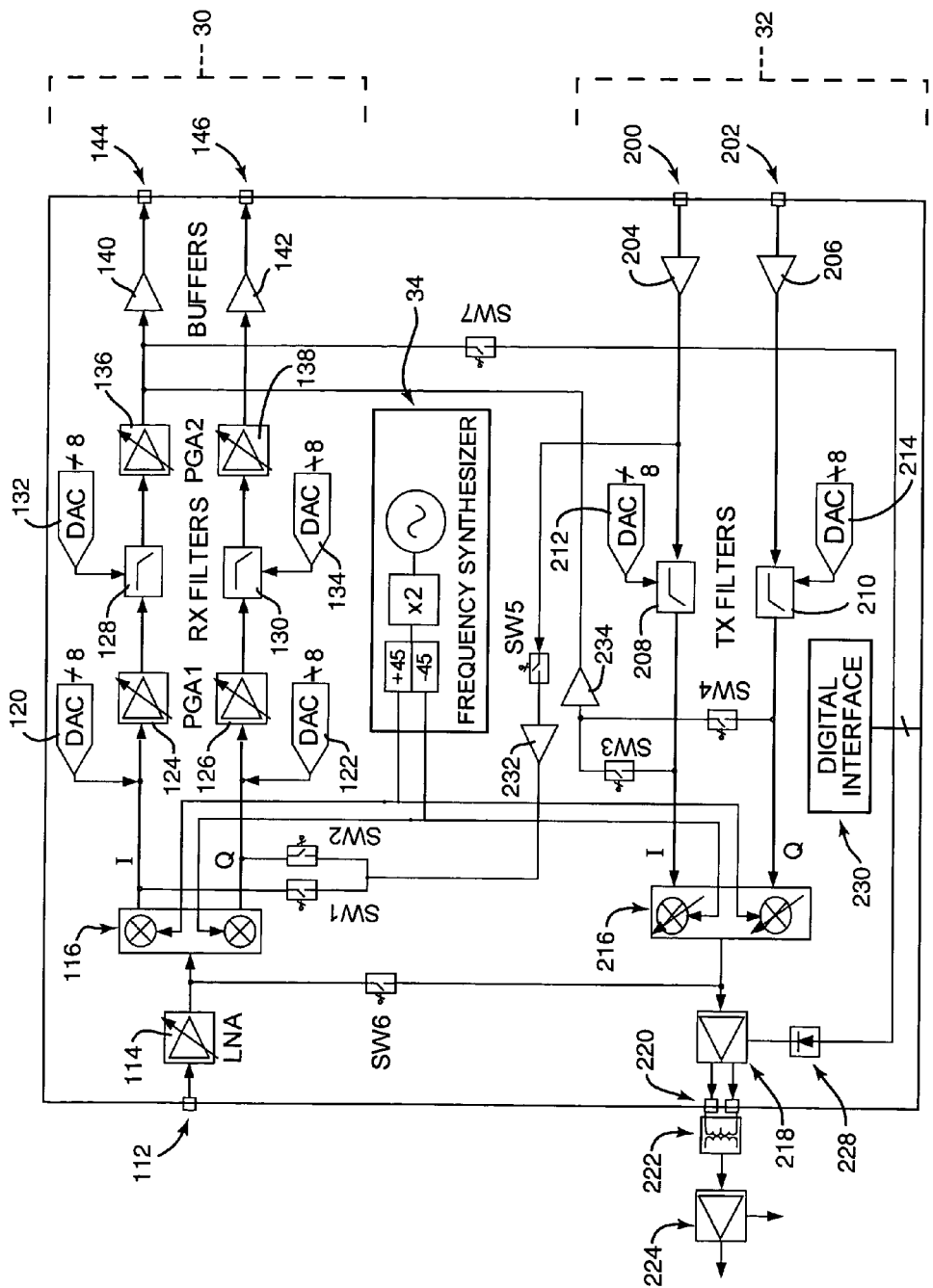
FIG. 2 is a block diagram illustrating the transceiver of the present invention.

FIG. 2 is a schematic diagram illustrating one embodiment of the transceiver 16 of the present invention. As described above, transceiver 16 includes a receiver 30, a transmitter 32, and a frequency synthesizer 34. Both transmitter and receiver components preferably use direct conversion and employ fully differential signal paths to minimize crosstalk and externally induced noise.

Receiver

The receiver 30 includes a receiver input 112, which provides a signal received by the transceiver 16 from the antenna 12. The signal is preferably in differential form to reduce second order distortion and minimize substrate and supply coupling, such that positive (P) and negative (N) terminals are used; however, signals in other forms can be used with the present invention in alternate embodiments.

The received signal is sent from the input 112 to a low noise amplifier (LNA) 114, which amplifies the received signal. The LNA has sufficient gain to provide a signal having a high enough amplitude for use in the receiver while introducing little noise to the signal. One suitable embodiment of LNA 114 is described below with reference to FIG. 4.

The amplified signal from LNA 114 is provided to a quadrature demodulator 116, which downconverts the high frequency signal directly into the baseband frequency. The quadrature demodulator 116 includes two mixers in the described embodiment, which are described in greater detail with respect to FIG. 5. The quadrature demodulator 116 receives a reference (LO) signal at a desired frequency from a frequency synthesizer 34, described in greater detail below with respect to FIG. 3. The demodulator 116 separates the received passband signal into two baseband differential signals, one In-phase (I) and one Quadrature (Q).

The quadrature demodulator 116 can introduce DC offset to the signal, which is corrected in the preferred embodiment by a DC offset correction circuit and calibration, as described in greater detail below. Large DC offset can corrupt a weak signal or saturate the baseband circuits, programmable gain amplifiers (PGAs) 124 and 126, filters 128 and 130, etc. The overall receive chain path DC offset is calculated in the calibration cycles and in subsequent DC offset tracking cycles and is real-time corrected (adaptively cancelled) at the output of the mixers of the quadrature demodulator 116 by two independent 8-bit current steering digital-to-analog converters (DACs) 120 and 122. DAC 120 corrects the DC offset on the I path of the demodulator 116, and DAC 122 corrects the DC offset on the Q path of the demodulator 116, by adding a small DC voltage (relative to the DC voltage level) to the signal at the output of the demodulator 116 and input to the PGA 124 or 126.

The baseband path of the receiver includes components of amplifiers, filters, and output buffers on the I and Q paths. The baseband path can include different components in other embodiments; a direct-conversion baseband path, in general, performs filtering and variable gain.

Digitally programmable gain amplifiers (PGAs) 124 and 126 receive the outputs of the demodulator 116 on the I and Q paths, respectively. PGA 124 can employ, for example, a low-noise, high dynamic range single-stage amplifier with a resistive attenuator at its input, but can be other types of programmable amplifiers in alternate embodiments. The gain of the PGA 124 and 126 is programmable by a digital word provided by the baseband processor 18, e.g., via the AGC programming bus 50. Other embodiments can also be used, such as variable gain amplifiers (VGAs) controlled by an analog voltage.

Low pass filters 128 and 130 receive the output of the corresponding PGA 124 or 126 on the I and Q paths, respectively, and perform baseband channel selection. In one embodiment, a fourth order Chebyschev filter can be used for each filter 128 and 130; however, any filter can be used which can be tuned by a voltage or by a digital word. An example of a filter suitable for use is described in greater detail with respect to FIGS. 6a and 6b. The response of each filter 128 and 130 can be tuned to a desirable cutoff frequency and bandwidth by the DC voltage Vc generated by DACs 132 and 134, respectively. The DACs are controlled by signals from the processor 18 to enable the receive filters to be tightly matched in their responses with each other.

After the low pass filters 128 and 130, two secondary PGAs 136 and 138 are employed, where PGA 136 is used on the I path, and PGA 138 is used on the Q path. In the described embodiment, each PGA 136 and 138 is an operational amplifier-based feedback gain stage; other types of amplifiers can be used in other embodiments. To achieve optimum noise/linearity performance, the two PGAs 124 and 136 (or 126 and 138) are located before and after the channel-select filter 128 (or 130). In one example of the described embodiment, the composite gain of the amplifiers along a path (I or Q) can vary from 2 dB to 53 dB, programmable in 3 dB steps by an external 6-bit word provided by the processor 18. In general, PGAs 124/126 and 136/138 perform gain control. In other embodiments, the PGAs 124/126 and/or 136/138 can be merged with the filters 128 and 130 rather than being provided as separate components. Or, only one PGA (or other type of variable gain or fixed amplifier) can be after the filter or before the filter; or, one fixed amplifier is provided before and a variable gain amplifier after (or vice versa), etc.

An output buffer 140 and 142 is employed at each of the I and Q paths, respectively, after the PGAs 136 and 138. The outputs of the buffers 140 and 142 are provided at receiver outputs 144 and 146 of the transceiver 16, where each path provides a differential signal having positive and negative components. The signals from these receiver outputs are provided to processor 18 as explained above with respect to FIG. 1.

Transmitter

The transmitter 32 of transceiver 16 is a direct conversion, up-conversion transmit path and includes transmitter inputs 200 and 202. The inputs 200 and 202 receive a signal from the baseband processor 18 which has formulated the analog signal that is to be upconverted and transmitted by the transceiver 16. For example, in the described embodiment, the transmit path input analog signal is provided by DACs 46a and 46b located at the processor 18, as described above with respect to FIG. 1. The signal is preferably in the form of I and Q signals, where input 200 receives the I signal, and input 202 receives the Q signal. Furthermore, each I and Q signal path is preferably provided in differential form, such that positive (P) and negative (N) terminals are used by each.

The I and Q signals to be transmitted are sent from the inputs 200 and 202 to input buffers 204 and 206, respectively. From the outputs of the buffers 204 and 206, the I and Q signals are sent to transmit baseband filters 208 and 210, respectively. These filters are low pass filters, e.g., they can be the same or similar to the filters 128 and 130 used in the receiver of the transceiver 16 as described above. Similarly to the low pass filters of the receiver, the responses of the transmit filters 208 and 210 can be preferably tuned to the desirable cutoff frequency and bandwidth by the DC voltage Vc generated by 8-bit DACs 212 and 214, respectively. In other embodiments, variable gain stages can be included before, after, or merged with the filter.

The outputs of the filters 208 and 210 provide the filtered I and Q signals to a programmable gain modulator (PGM) 216. In other embodiments the modulator 216 can be fixed gain. The PGM 216 up-converts the I and Q pathways to a single transmit path at the desired RF carrier frequency, i.e., the mixer modulates the baseband signals directly into the high frequency signal. Similar to the quadrature demodulator 116, the PGM 216 receives a reference (LO) signal at a desired frequency from frequency synthesizer 34, described in greater detail with respect to FIG. 3. PGM 216 utilizes two mixers, where a mixer type suitable for use in PGM 216 is described in greater detail below with respect to FIG. 7.

The output of the I and Q mixers in the PGM 216 is summed in order to drive the RF output amplifier. Gain programmability of the PGM 216 is achieved by adjusting the input transconductance stage using a switchable resistive ladder at the input of the mixers (shown as Rg in FIG. 7, below). In one example embodiment, the modulator 216 provides 27 dB of gain control in 3 dB steps.

The output of the PGM 216 is preferably a fully differential signal path, but in alternate embodiments can take other forms. The differential output of the PGM 216 is amplified by an RF output driver amplifier 218, also preferably differential. In the described embodiment, the driver amplifier 218 can be a single stage cascoded differential pair, inductively degenerated to improve linearity. In other embodiments, amplifier 218 can have variable programmable gain. The RF amplifier amplifies the signal from the modulator 216 to deliver the signal to the antenna 12. The signal can be then sent to an external power amplifier, can be first filtered first and then delivered to an external power amplifier, or can be filtered and delivered to the antenna, e.g., via the switch 14.

The output of the driver amplifier 218 is converted to a single-ended signal (in most embodiments) via a balanced-to-unbalanced converter (BALUN) or transformer 222, the output of which is then applied to the input of an external power amplifier (PA) 224. In the described embodiment, the amplifier 224 and transformer 222 are shown located off of the chip of the transceiver 16 and receiving the signal via the output 220 of the chip; however, the amplifier 224 and/or transformer 222 be located on the chip in other embodiments.

Envelope detector 228 has an input connected to the driver amplifier 218 for receiving the output RF transmit signal and detects an envelope of the signal, e.g. amplitude demodulates the signal. The detector 228 has an output connected to the I path of the receiver 30 after PGA 136 via switch SW7. When SW7 is enabled ("closed") then the envelope detector 228 is connected to the I channel and provides the envelope of the transmitted signal to the analog I output of the receiver and thus to processor 18. This signal path is active in calibration mode, when the transmit I/Q mismatch and LO leakage are measured. This operation is described in greater detail with respect to FIG. 8. When SW7 is inactive ("open"), then the envelope detector 228 is not in use. Envelope detector 228 can be included on the chip of the transceiver 16, or be made external to the transceiver chip. Also, in other embodiments, detector 228 can be located after the PGM 216 or after the PA 224, or can be part of the PA 224.

Calibration Switches and Interface

A number of calibration "loop-back" switches are provided in the transceiver 16 to allow the calibration of the present invention to be performed. The calibration, or parts thereof, occurs upon power-up of the system 10, and also may occur during operation. The switches allow desired feedback or loopback paths of the transceiver 16 to be selected to be active so that calibration can occur. The calibration procedure is described in greater detail with respect to FIG. 8.

Calibration switches SW1, SW2, and SW5 enable measurement of frequency response of the receiver baseband filters, which can then be tuned to the desired cutoff by DACs 132 and 134. When switch SW5 is controlled to be closed, the output of the buffer 204 (e.g., a calibration signal from the processor 18) is routed to switches SW1 and SW2 instead of to the transmitter 32 (a buffer 232 can be provided after the switch SW5). If switch SW1 is closed in addition to SW5 (and all others open), the signal is routed to the I-path of receiver 30 after the quadrature demodulator 116. If switch SW2 is closed in addition to SW5 (and all others open), the signal is routed to the Q-path of receiver 30 after the quadrature demodulator 116 output. Thus, the receiver I-path is measured from the feedback path formed by switches SW5 and SW1, while the receiver Q-path is measured from the feedback path formed by switches SW5 and SW2. This allows the processor 18 to measure the filter frequency response of the I and Q receiver paths by receiving calibration signals back through the receiver 30.

Calibration switches SW3 and SW4 similarly enable measurement of the frequency response of the transmitter baseband filters 208 and 210, which can then be digitally calibrated to the desired cutoff by DACs 212 and 214. When switch SW3 is controlled to be closed (and all others open), a feedback path is formed from the output of filter 208 to the I-path of the receiver after PGA 136. When switch SW4 is controlled to be closed (and all others open), a feedback path is formed from the output of filter 210 to the I-path of the receiver after PGA 136. A buffer 234 can be provided in the feedback path after the switches SW3 and SW4.

Calibration switches SW6 and SW7 are used for transmitter and receiver I/Q mismatch measurement. As described above, when switch SW7 is closed and the other switches open, the RF output of the transmitter is output from driver 218, through the envelope detector 218 to the I-path at the receiver output, through the receiver buffer 140, and back to processor 18. This allows a calibration waveform sent to the transmitter to be amplitude demodulated by the envelope detector, bypass the receiver, and fed back to the processor 18, where the envelope of the RF signal is digitized by the ADC 38a of the processor 18. The detected envelope is used to jointly measure transmitter I/Q mismatch and LO leakage, described in greater detail with respect to FIG. 8. Alternatively, the calibration path of SW7 can go to any other dedicated pin or connection that can be received and digitized by the processor, or to any other point of the baseband receive chain, I or Q, as long as there is a way for the baseband processor 18 to read the information.

Switch SW6 enables a feedback loop between the transmitter and the receiver. When switch SW6 is closed (and all others open), a path is formed from the output of PGM 216 on the transmitter to the input of the quadrature demodulator 116 of the receiver. Thus a calibration waveform can be sent from the transmitter 32 to the front of the receiver 30, to be received by processor 18 through the receiver. The received waveform can be used in measuring receiver I/Q mismatch (see FIG. 8).

Digital interface 48 provides the interface to the transceiver 16 to allow the control/programming signals from the processor 18 to power up or down different sections of the transceiver, e.g., to make sure that, in various calibration modes, different sections of the transceiver are powered up and down (the components/sections powered up are generally those where the signal passes through or necessary for signal passage). Interface 48 also allows the signals from processor 18 to operate calibration control circuitry on the transceiver, such as the DACs 120, 122, 132, 134, 212 and 214, and the control switches (described above) to create the necessary loopback paths for calibration. The digital interface 48 can send commands that are decoded in the transceiver (by logic, etc.) which sends the appropriate control signals or digital words to the switches, DACs, etc., and to power up and down different sections.

Frequency Synthesizer

Figure 3:
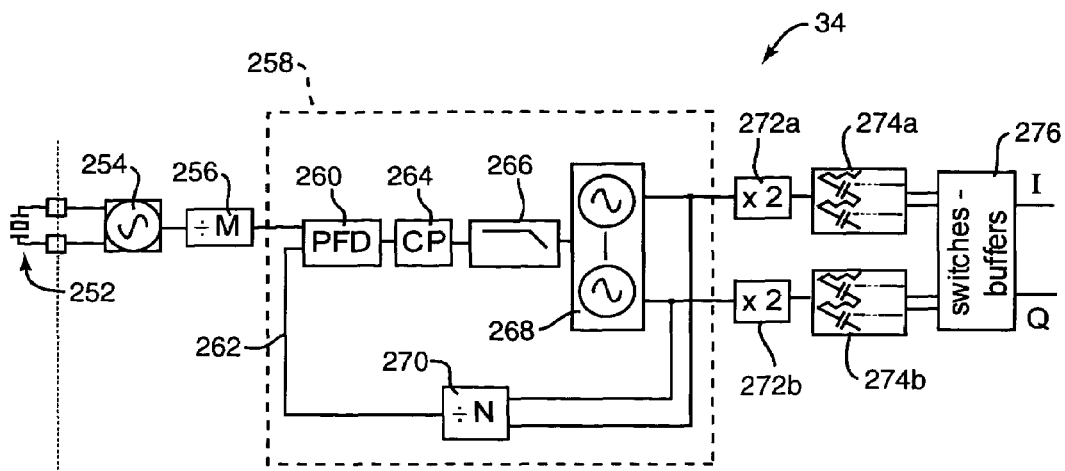
FIG. 3 is a block diagram illustrating an example of a frequency synthesizer suitable for use with the transceiver of the present invention.

FIG. 3 is a block diagram illustrating an embodiment of the frequency synthesizer 34 suitable for use in the transceiver 16 of FIG. 1. Frequency synthesizer 34 generates I and Q reference signals having desired frequencies, for use in the quadrature demodulator 116 used in demodulating a received signal to baseband frequency, and in the programmable gain modulator 216 used in modulating a signal to a desired transmitted high RF carrier frequency. In one example, the described frequency synthesizer can achieve phase noise better than −115 dBc/Hz at 1 MHz offset and integrated phase noise of less than 0.8° from 1 kHz to 10 MHz. Preferably, the frequency synthesizer can be tuned by control signals from the processor 18.

Other embodiments can use different frequency synthesizers; the main requirement is that the frequency synthesizer produces the LO signal at the carrier frequency, which is required for direct conversion, or produces an LO signal suitable for another architecture that uses a higher than DC intermediate frequency (IF) at the I and Q interface with the baseband frequency, such as a low-IF architecture.

Frequency synthesizer 34 receives a signal from a crystal oscillator 254, which generates a signal of a particular frequency (i.e., the reference frequency of the synthesizer or an integer multiple of this, since divider 256 can be used to derive the reference frequency). In the described embodiment, the active circuitry of crystal oscillator 254 is implemented on the transceiver chip and uses a crystal 252 which is situated off-chip from the transceiver 16.

The frequency synthesizer includes a divider 256, which receives the signal from the reference oscillator 254 and divides it by a factor M to a desired reference frequency. Based on the reference frequency, a phase-locked loop (PLL) 258 generates an LO signal having an accurate particular frequency.

For example, in the described embodiment, an integer-N PLL is provided which uses a third order passive loop filter. In direct conversion, the desired LO signal is at the carrier frequency, which may cause problems since the VCO can be "pulled" by the transmitted signal. In this embodiment, to minimize VCO pulling and avoid interference with the RF signal, the LO signal is generated at half the desired frequency.

PLL 258 includes a phase-frequency detector (PFD) 260 that receives the reference clock signal from the divider 256 and detects the difference in phase between the reference clock signal and a feedback clock input 262. The PFD 260 generates "UP" and "DOWN" control signals indicative of whether the feedback phase leads or lags the reference phase.

The control signals are passed to and control a charge pump 264, which sinks current when receiving a "DOWN" pulse and sources current when receiving an "UP" pulse. In a described embodiment, the charge pump 264 employs a replica bias circuit, which helps achieve very low in-band phase noise and spurs below −70 dBc. However, any type of charge pump circuit can be used in the frequency synthesizer 34. For example, one charge pump suitable for use is described in copending U.S. patent application Ser. No. 10/622,330, entitled, "Current Steering Charge Pump," filed Jul. 17, 2003 and incorporated herein by reference in its entirety.

The output pump current of the charge pump 264 is provided to a low pass filter 266, which generates a control voltage from the charge pump current. The control voltage output by the loop filter 266 is provided to a voltage controlled oscillator (VCO) bank 268, which includes multiple VCOs (two, in the described embodiment) that each can oscillate at a higher or lower frequency based on the control voltage level. Only one VCO is active at any time, depending on the selected RF channel where the transceiver is desired to operate at a particular time; e.g., the active VCO can be selected by switches. Each VCO 268 stabilizes when the reference and feedback clocks are at the same phase and frequency. For example, in a 802.11a wireless LAN embodiment, one VCO can be centered at 2.625 GHz to cover the RF band from 5.15

GHz to 5.35 GHz, and the other VCO can be centered at 2.8875 GHz to cover the RF band from 5.725 GHz to 5.825 GHZ.

Any type of VCO can be used in the frequency synthesizer 34. For example, in one embodiment, each VCO in bank 268 can use a complementary pair of negative resistor structures, which results in reduced flicker noise up-conversion. Fine-tuning can be achieved by accumulation-mode MOS varactors, while a switched capacitor bank can provide extra tuning range to absorb process variations. Other VCO implementations can be used in other embodiments.

The output of the VCO bank 268 is the output of the PLL and provides the basis of the feedback clock 262. The output of the VCO is divided by a factor N to a desired frequency by a divider 270, has an output that is the feedback clock 262. Thus, the signal from the low pass filter controls the VCO frequency which, by virtue of the negative feedback loop formed, is forced to track the input reference frequency multiplied by the reference divider value "N".

The output of VCO bank 268 is also provided to frequency doublers 272a and 272b to be multiplied by 2 in order to generate the desired LO frequency. In the described embodiment, the doublers 272a and 272b can each be a Gilbert cell-based doubler. In a 802.11a embodiment, one VCO output can be a 5.25 GHz branch, and the other output can be a 5.775 GHz branch. The output of each doubler 272a and 272b is provided to a corresponding second order polyphase filter 274, which produce the desired I and Q signals which are input to output block 276. Block 276 includes active RF switches that can select the appropriate LO. For example, in a 802.11a embodiment, the receiver demodulator 116 and the PGM 216 can receive as LO inputs either the 5.25 GHz LO (I and Q) or the 5.775 GHz LO (I and Q), and the RF switches can select the appropriate LO.

Other Transceiver Components

Figure 4:
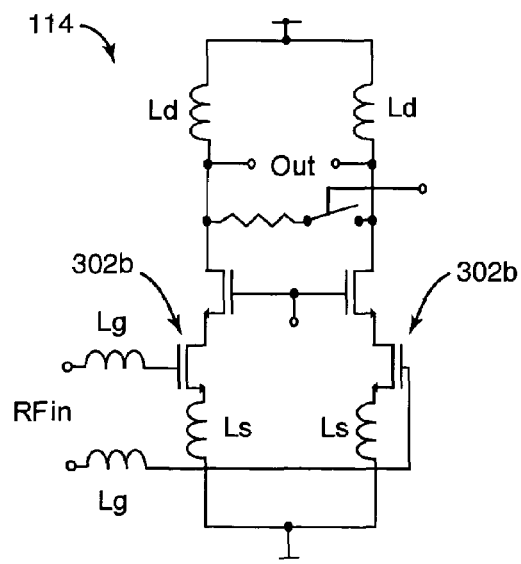
FIG. 4 is a schematic diagram illustrating an example of a low noise amplifier suitable for use with the transceiver of the present invention.

FIG. 4 is a schematic diagram illustrating an example of a low noise amplifier (LNA) suitable for use as LNA 114 of the transceiver 16, shown in FIG. 2 referenced above. Other implementations of an LNA 114 can be used in other embodiments.

The fully balanced low noise amplifier (LNA) 114 shown in FIG. 4 includes an NMOS common-source cascode differential pair, including transistors 302a and 302b, with inductive degeneration, provided by inductors Ls, which can be on-chip spiral inductors, for example. Inductors Ld (which can also be on-chip spiral inductors) are used for the load of the LNA, while bond-wire inductors and package inductances Lg can be used for input matching, which result into lower-loss and reduced area compared to on-chip matching schemes. In a wireless LAN 802.11a embodiment, input matching can be wideband to cover all three 802.11a bands. In one example, two gain settings of 18 dB/10 dB can be selected by resistive loading of the output, which can help reduce variations in input impedance.

Figure 5:
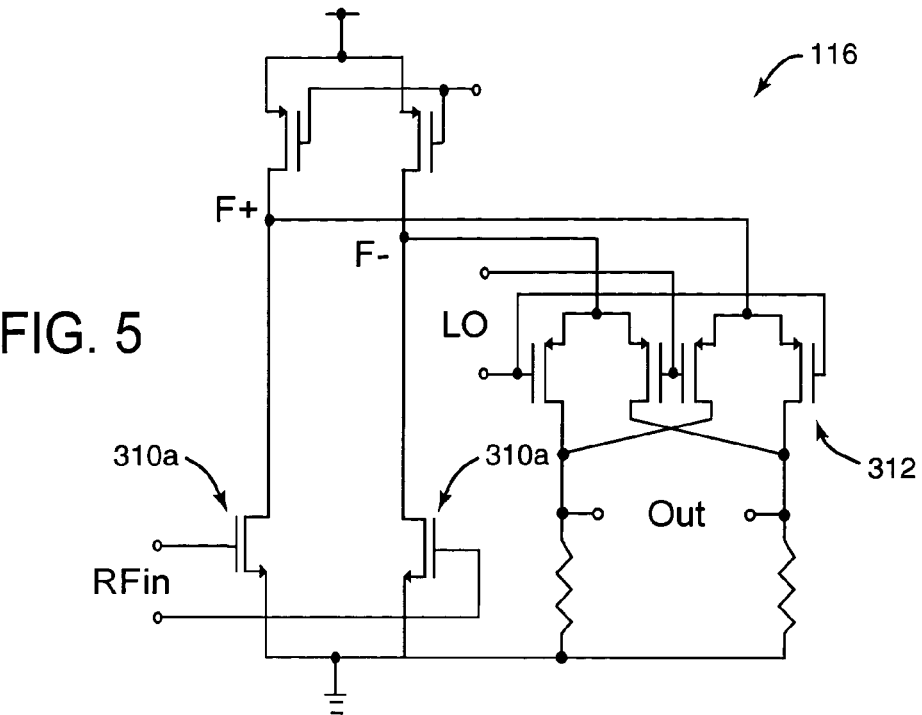
FIG. 5 is a schematic diagram illustrating an example of a mixer suitable for use in the quadrature demodulator of the transceiver of the present invention.

FIG. 5 is a schematic diagram illustrating an example of a quadrature demodulator suitable for use as the quadrature demodulator 116 of the transceiver 16 of FIG. 2. The input to modulator 116 is demodulated directly into baseband based on the circuit shown in FIG. 5. Since, in direct conversion receivers, the output of the RF mixers is a baseband signal, flicker noise from the switching pair may severely impact the received signal-to-noise ratio (SNR). Thus, the circuit 116 uses NMOS devices 310a and 310b to convert the input RF signal into current, which is subsequently folded into a PMOS switching pair 312. This structure presents inherently low flicker noise at the output because of the inherently lower flicker noise of the PMOS devices. The high conversion gain achieved by the input transconductance stage helps minimize the contribution of the PMOS current sources in the overall noise figure.

Another mixer implementation which can be used for demodulator 116 is described in copending U.S. patent application Ser. No. 10/622,330, entitled, "High Frequency Mixer with Tunable Dynamic Range," filed Jul. 17, 2003 and incorporated herein by reference in its entirety. Other implementations of modulator 116 can be used in other embodiments.

Figure 6A:
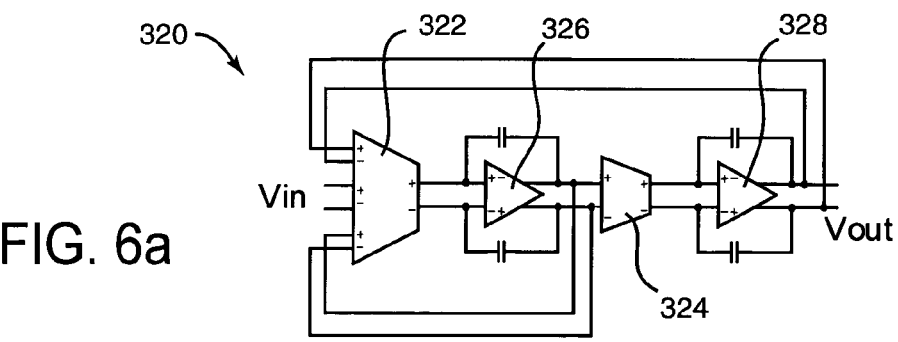
FIGS. 6a and 6b are schematic diagrams illustrating an example of a channel selection filter suitable for use with the transceiver of the present invention.

FIG. 6a is a schematic diagram illustrating an example of a basic biquad structure 320 used as a building block in implementing a low pass filter suitable for use as low pass filter 128, 130, 208, and 210 of the transceiver 16 of FIG. 2. Other implementations can be used in other embodiments.

In the described embodiment, the low pass filters can each be a fourth order Chebyschev filter with a nominal bandwidth of 9 MHz and a nominal ripple of 0.5 dB, and can be implemented as a cascade of two biquads 320. Biquad 320 can include integrators based on the Gm-OTA-C topology. Operational transconductance amplifiers (OTA) 326 and 328 are simple differential pairs, and transconductor cells 322 and 324 are based on the regulated cascode topology described below with reference to FIG. 6b.

Figure 6B:
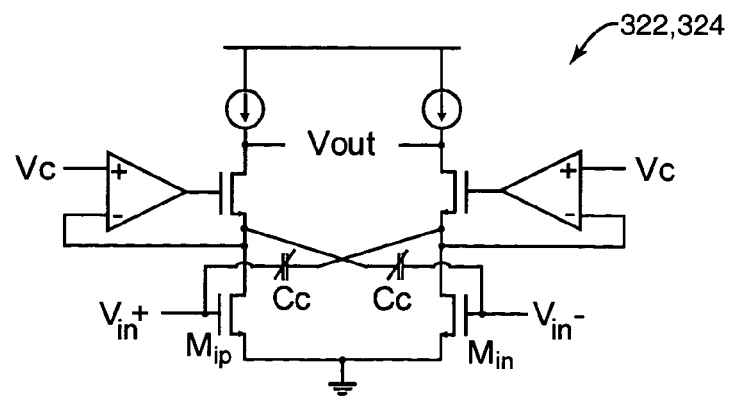

FIG. 6b is a schematic diagram illustrating the transconductor cells 322 and 324 of the biquad 320 of FIG. 6a. The transconductance of the cell can be set by a tuning voltage Vc, which is applied to the drains of the input transistors Mip and Min operating in the triode region. The tuning voltage Vc can be generated by the DAC 132 or 134 (or 214/212), controlled by the baseband processor 18, as described above with reference to FIG. 2. The feedforward MOS capacitor array Cc can be used for controlling the quality factor Q of the filter.

Figure 7:
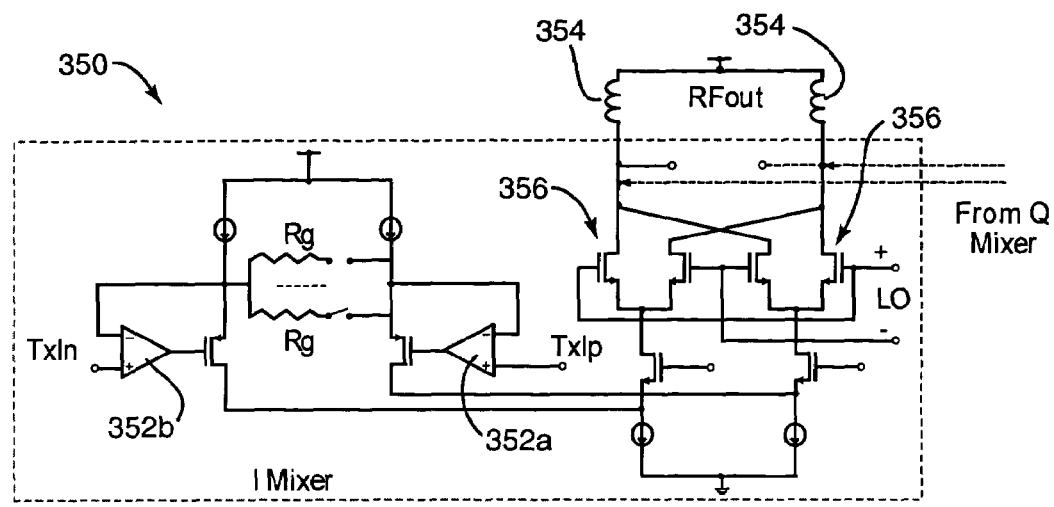
FIG. 7 is a schematic diagram illustrating an example of a mixer suitable for use in the programmable gain modulator of the transceiver of the present invention.

FIG. 7 is a schematic diagram illustrating an example of a mixer 350 suitable for use in PGM 216 of the transceiver 16 of FIG. 2. PGM 216 can use two of the mixers 350, one for the I path, and one for the Q path. Only the I path mixer is shown in FIG. 7, for simplicity. The outputs of the I path and Q path mixers are combined as currents and are loaded by the inductors 358, as shown. Other implementations can be used in other embodiments.

Mixer 350 can be based on a folded cascode Gilbert-type mixer. To achieve the required linearity, the modulator input voltage is converted into a current across the degeneration resistors Rg by a negative feedback loop that employs high gain-bandwidth operational amplifiers 352a and 352b. The current is then folded via a cascode current source to drive the mixer switches 356. The LO, signal 354 is the appropriate I path or Q path signal from the frequency synthesizer 34.

Calibration Procedures

FIG. 8 is a flow diagram illustrating a method 400 of the present invention for calibrating the system 10 to minimize undesired characteristics of the transceiver 16. Such undesirable characteristics include DC offset, transmitter LO leakage, transmit and receive I/Q gain and phase mismatch, and mismatch of baseband filter characteristics. By using loopback switches as described above, the DC offset, transmitter and receiver I/Q gain mismatch and I/Q frequency response can be independently calculated and corrected. The method 400 is preferably implemented at power up, as described below, but parts of the method can be performed at other times, such as during the idle time between received and transmitted frames. In these described methods, the calibration steps are typically described with reference to processor 18, and this term in this context may refer to one or more processors that can implement the calibration methods 20, such as a dedicated or local processor, a host processor, etc. The calibration methods 20 and digital correction blocks 40 and 44 of the 18-processor module can preferably be implemented by the "free" resources of processor 18.

The method begins at step 402, and in step 404, the system 10 is initially powered up. This allows various initial calibrations of the present invention to be performed, which take a small amount of time upon power-up of the device in which system 10 is situated.

In step 406, static DC offset calibration is performed, in which the DC offset in the receiver baseband path is minimized. This is described in greater detail with respect to FIG. 9. The DC offset calibration step 406 can happen first in the power-up calibration or after other steps in the method 400. This can also occur in a period between frames, as described with reference to FIG. 9.

In step 408, filter calibration is performed, in which the filters on both the receiver and the transmitter 30 and 32 are calibrated. This is described in greater detail with respect to FIG. 10.

In step 410, local oscillator leakage as well as transmitter and receiver I/Q mismatch calibration is performed, in which calibration parameters used by correction block 44 and 40 of processor 18 are determined based on the characteristics of calibration waveforms provided to the transmitter and receiver. This is described in greater detail with respect to FIG. 11.

In step 412, ongoing adjustment and calibration is performed during normal operation of the system 10 and possibly in inter-frame periods. For example, adjustment includes the correction operation of the real-time correction blocks 40 or 44 of the processor 18, programmed with the calibration parameters determined in step 410, which perform post- or pre-distortion on a signal/data when a signal is received by the receiver, or a signal is transmitted by the transmitter, respectively, during normal operation to remove LO leakage and I/Q mismatch in the signal. Ongoing adjustment can also include determining calibration parameters at other gain settings and/or channels at later times (after power-up), based on user selections or other conditions. Ongoing calibration can include re-adjustment of DC offset for temperature drifts and possibly re-adjustment of other parameters (which is typically not needed). The process is thus complete at 414.

Figure 9:
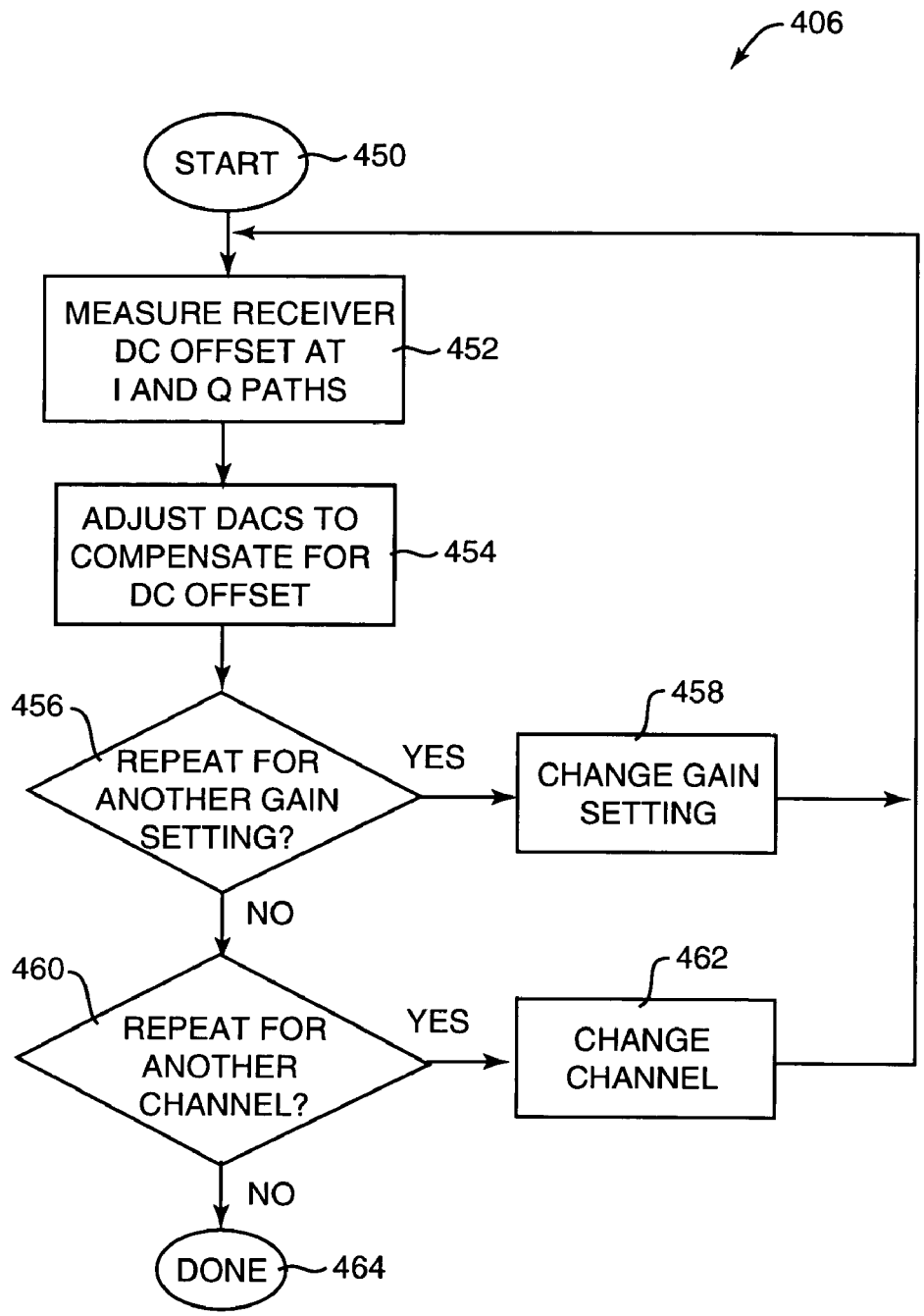
FIG. 9 is a flow diagram illustrating the step of FIG. 8 for calibrating receiver DC offset.

FIG. 9 is a flow diagram illustrating a method of step 406 of FIG. 8, in which the receiver is calibrated to minimize DC offset. The process begins at 450, and in step 452, the DC offset in the receiver is measured for the I-path and the Q-path. No calibration switches are set for this calibration; the DC offset is measured based on the output of the receiver 34 which is digitized by the ADCs of processor 18. During this measurement, the LO signal from the frequency synthesizer 34 is tuned to the desired frequency of operation and the transceiver is on "receive" mode. This method allows for the measurement of the static DC offset of the receiver at a particular RF channel and receive gain setting.

In step 454, the DACs 120 and 122 are controlled by processor 18 to adjust the voltage added at the output of the demodulator 116 in the analog domain to eliminate (or minimize) the DC offset. First, the output of DAC 120 is adjusted by the processor 18 to eliminate the DC offset on the I-path, then the output of DAC 122 is adjusted by processor 18 to eliminate the offset on the Q-path. The output of the DAC that minimizes the DC offset can be found by performing iterative measurements, for example by utilizing a binary search.

In step 456, it is checked whether the above steps are to be repeated for a different gain setting. In one embodiment, the DC offset is minimized independently for a number of different gain settings at power-up. Thus, in such an embodiment, the process continues to step 458, in which the gain setting for the receiver is changed by the processor 18 using the digital interface signals 50. The process then returns to steps 452 and 454 to remove the DC offset at the new gain setting. If other gain settings are not to be calibrated for DC offset in step 456, then the process continues to step 460. Optionally, if multiple gain settings are calibrated, then the correction values (calibration parameters) that minimize the DC offset at each gain setting can be stored in a look-up table or other storage (e.g., in memory on the processor 18, transceiver 16, or host device) that associates the receiver gain with the DC offset correction values at each DAC 120 or 122. Thus, when a particular gain setting is used during normal operation, the appropriate calibration parameters can be quickly accessed and used to adjust the DACs to the proper output to minimize the DC offset at that gain setting.

In step 460, it is checked whether the above steps are to be repeated for another frequency channel. Preferably, DC offset calibration parameters are determined upon power-up for a number of different channels in the desired frequency bands of operation. The number of channels so calibrated can be determined by the likely number of channels to be used during transceiver operation. If another channel is to be calibrated for offset, then the process continues to step 462 to change the frequency of the LO by adjusting the parameters of the frequency synthesizer, and the process returns to step 452 to begin the DC offset calibration again at the new channel. Similar to the different gain settings, the calibration parameters for different channels can be stored in a lookup table or other storage for later retrieval when needed. Alternatively, in a preferred embodiment the calibration parameters for a particular channel can be determined at the time when a user or operator selects to operate at that different channel. Once no additional channels are to be calibrated for DC offset at step 460, the process is complete at 464.

The DC offset calibration can be repeated periodically to compensate for temperature drifts, as indicated by step 412 of FIG. 8. For example, in 802.11a systems, consecutive frames are received or transmitted with a 16 usec turnaround time, which allows for short DC offset calibration cycles even during continuous reception or transmission of frames. The short duration of 802.11a frames ensures that fast temperature drifts can be tracked.

Figure 10:
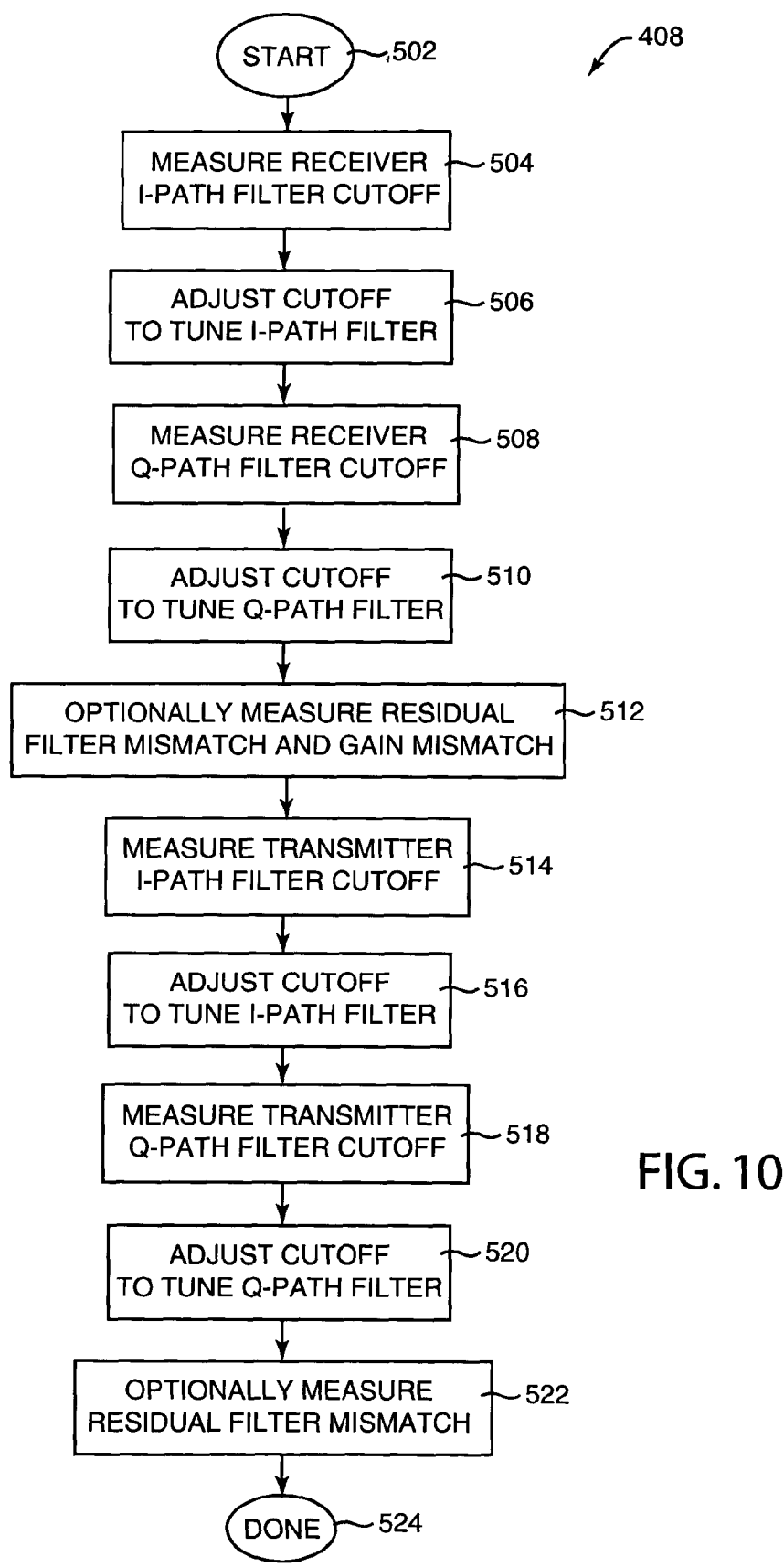
FIG. 10 is a flow diagram illustrating the step of FIG. 8 for calibrating the channel selection filters of receiver and transmitter.

FIG. 10 is a flow diagram illustrating a method of step 408 of FIG. 8, in which the receiver and transmitter filters are calibrated.

The process begins at 502, and in step 504, the cutoff frequency of I-path filter 128 of the receiver 30 is measured. In the embodiment of FIG. 2, the switches SW1 and SW5 are closed while the other switches remain open to make the receiver I-path filter loopback connection active, and a calibration waveform is sent by the processor 18 to the transmitter 32 I path. The calibration waveform is looped back to the receiver I-path before passing through the transmitter, and the processor 18 reads the signal back through the receiver for measurement. For example, in a wireless LAN application, a calibration sequence generated digitally can be used to set the bandwidth to 9 MHz.

In step 506, the cutoff frequency of the filter 128 is adjusted by the processor 18/controller 20 to calibrate the filter to the desired cutoff frequency. This is accomplished by controlling DAC 132 to adjust the cutoff frequency as described above. Repetition of steps 504 and 506 can be an iterative process, where a simple sinewave is sent at a low frequency (for example, 1 MHz) and the amplitude of the received signal is measured. To adjust the 3-dB cutoff of the filter at a frequency, for example, of 11 MHz, a sinewave at 11 MHz can be sent and the DAC is adjusted until the signal strength received is 3 dB smaller than the 1 MHz case. This same iterative process can be used for every filter calibration described herein.

Preferably, during the measurement and adjustment of steps 504 and 506, only the components of the I-path where the signal is passing are powered up, while the other components of the transceiver are powered down, e.g., only buffers 204 and 232, DAC 120, PGA 124, filter 128, DAC 132, PGA 136, and buffer 140 are powered up. Also, the gains of PGAs 124 and 136 can be adjusted for these steps so that the received signal from buffer 140 has a high signal to noise and distortion ratio (SNDR) (this adjustment of PGAs 124 and 136 for high SNDR is also preferably performed for all the other calibration loopback steps of the present invention that provide programmable gain via the PGAs.

In step 508, the cutoff frequency of Q-path filter 130 of the receiver 30 is measured. The switches SW2 and SW5 are closed while the other switches remain open to make the receiver Q-path filter loopback connection active, and a calibration waveform is fed to the receiver Q path to be read by processor 18. In step 510, the cutoff frequency of the filter 130 is adjusted by the processor 18 to calibrate the filter to the desired cutoff frequency by controlling DAC 134. As in step 506, this adjustment can be an iterative process.

As in steps 504 and 506, preferably only the components of the Q-path where the signal is passing are powered up during the measurement and adjustment of steps 508 and 510, e.g., only buffers 204 and 232, PGA 126, DAC 122, filter 130, DAC 134, amplifier 138, and buffer 142 are powered up. Also, the gains of PGAs 126 and 138 can be adjusted for these steps for high SNDR.

Optional step 512 can be performed in alternate embodiments to measure residual filter mismatch and gain mismatch to further fine-tune the performance of the receiver filters. This further performance tuning can be performed using digital pre/post-distortion of the transmitted/received signal, but is not needed in the preferred embodiment. The passband of both the I and the Q filters can be measured (e.g., the passband for filter 128 can be measured during step 504, and the passband for filter 130 can be measured during step 506). Calibration parameters can then be computed to allow the processor 18 to adjust any received waveform during operation to remove residual mismatch along the passband by post-distortion. This enhances reliable operation at the desired passband, e.g., 54 Mbps for 802.11a wireless LANs. Furthermore, step 512 can also include a fine tuning of gain mismatch by, for example, using the receiver feedback from steps 504 and 508 to measure gain mismatch at different gain settings. The gain mismatch can be fine-tuned during operation by processor 18 applying post-distortion variations to received signals.

In step 514, the cutoff frequency of I-path filter 208 of the transmitter 32 is measured. The switch SW3 is closed while the other switches remain open to make the transmit I-path filter loopback connection active, and a calibration waveform is fed through the I-path filter 208 and looped back to the processor 18 for measurement (bypassing the receiver). In step 516, the cutoff frequency of the filter 208 is adjusted by the processor 18 to calibrate the filter to the desired cutoff frequency by controlling DAC 212. As in steps 504 and 506, this adjustment can be an iterative process, and preferably only the components of the path where the signal is passing are powered up during the measurement and adjustment of steps 514 and 516, e.g., only buffer 204, filter 208, DAC 212, and buffers 234 and 140 are powered up.

In step 518, the cutoff frequency of Q-path filter 210 of the transmitter 32 is measured. The switch SW4 is closed while the other switches remain open to make the transmit Q-path filter loopback connection active, and a calibration waveform is fed through the Q-path filter 210 and looped-back to the receiver to be read by processor 18. In step 520, the cutoff frequency of the filter 210 is adjusted by the processor 18 to calibrate the filter to the desired cutoff frequency by controlling DAC 214. As in steps 504 and 506, this adjustment can be an iterative process, and preferably only the components of the path where the signal is passing are powered up during the measurement and adjustment of steps 518 and 520, e.g., only buffer 206, filter 210, DAC 214, and buffers 234 and 140 are powered up.

Optional step 522 can be performed in, alternate embodiments to measure residual filter mismatch to further fine-tune the performance of the receiver filters, but is not needed in the preferred embodiment. The passband of both the I and the Q filters can be measured (e.g., the passband for filter 208 can be measured during step 514, and the passband for filter 210 can be measured during step 518). To compensate for any additional/residual mismatch in the passband of the filters, calibration parameters can then be computed to allow the processor 18 to adjust any received waveform during operation by post-distortion. The process is complete at 524.

Figure 11:
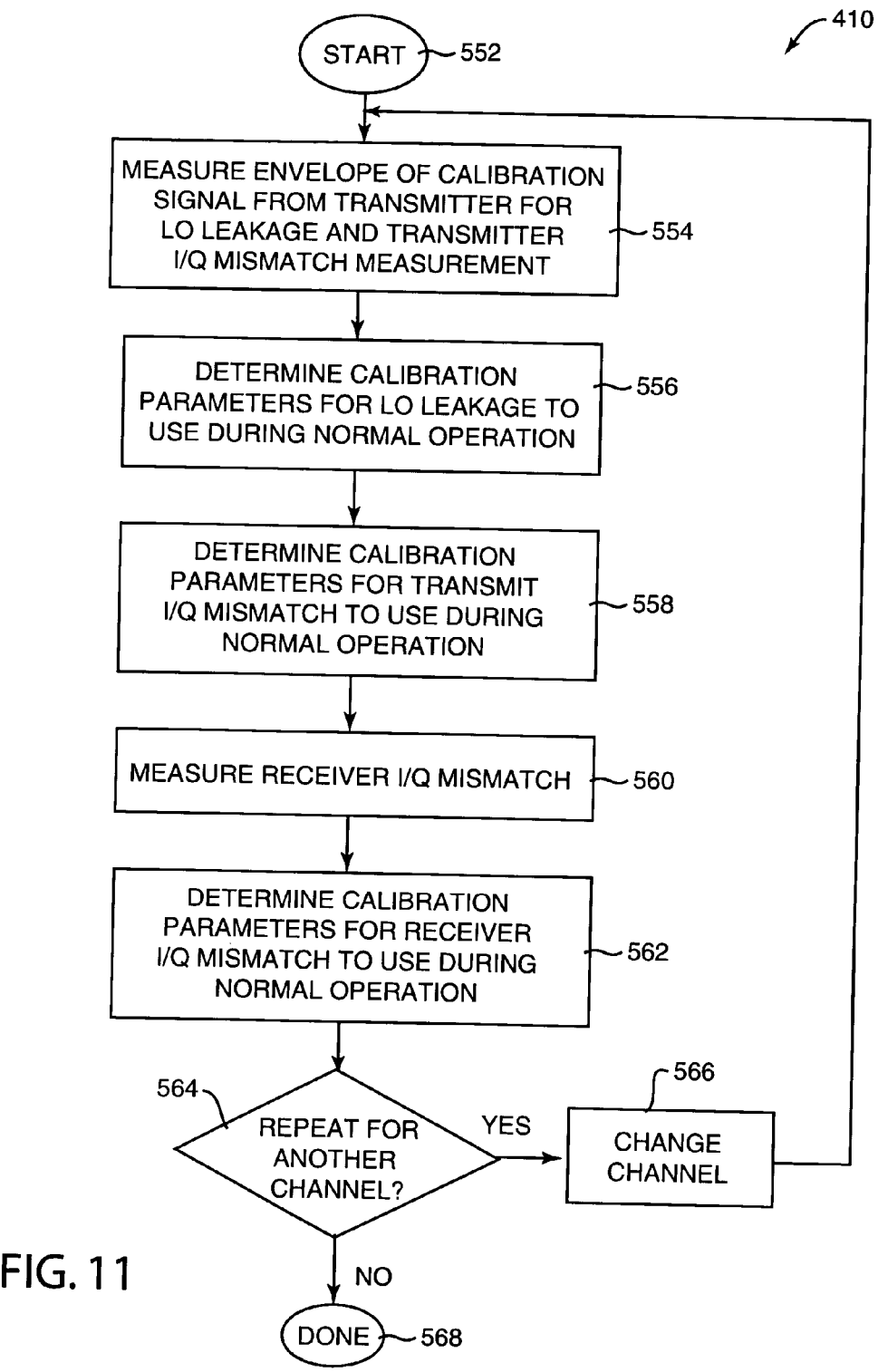
FIG. 11 is a flow diagram illustrating the step of FIG. 8 for calibrating LO leakage and I/Q mismatch for receiver and transmitter.

FIG. 11 is a flow diagram illustrating a method of step 410 of FIG. 8, in which local oscillator leakage and I/Q mismatch are measured for calibration and calibration parameters determined. These steps can be performed by calibration methods 20. During the initial I/Q mismatch calibration procedure (during power up), the external RF transfer switch 14 can be disconnected from the antennas 12 and the power amplifier 15 (see FIG. 1) is powered down to avoid violating spectral emission limitations, if such exist for a particular implementation.

The method begins at 552, and in step 554, an envelope of a transmitted calibration signal is measured for leakage of the LO signal of the frequency synthesizer 34 and for transmitter I/Q mismatch. To do this in the described embodiment, switch SW7 is closed while the other switches remain open to make the appropriate loopback connection active, and a calibration waveform is sent to the transmitter 32 so that the envelope of the waveform, provided by envelope detector 228, is digitized by ADC 38*a* of the processor 18.

In step 556, the calibration parameters to minimize LO leakage are determined by processor 18 based on the envelope received in step 554. Correction block 44 of processor 18 will use the calibration parameters during, normal real-time transmit operation of the system to adjust transmitted signals (before they are sent out) using digital pre-distortion so that LO leakage and I/Q mismatch (both gain and phase) will be minimized in transmitted signals.

Steps 554 and 556 can combined and iterated as necessary to implement their functions. Methods for envelope detection of a simple waveform, measurement of LO leakage and transmit I/Q mismatch from the envelope, and determination of calibration parameters for the leakage and transmit I/Q mismatch are well known, e.g., in J. K. Cavers, "New methods for adaptation of quadrature modulators and demodulators in amplifier linearization circuits," *IEEE Transactions on Veh. Technology*, vol. 46, no. 3, pp. 707-716, August 1997. Preferably, these steps need only be performed at power-up of the transceiver 16, and, during these steps the components of the receiver, except the buffer 140, can be powered down.

In step 560, receiver I/Q mismatch is measured by the processor 18. Switch SW6 is closed while other switches remain open to make the receiver mismatch measurement loopback connection active, and a calibration signal is sent through the transmitter by the processor 18. This calibration signal is calibrated (pre-distorted) by the processor 18 to minimize the transmitter I/Q mismatch using the calibration parameters determined in steps 554-556, so that minimal transmit I/Q mismatch will affect the calibration signal. The calibration signal is upconverted to RF at the modulator 216 and looped-back to the input of the quadrature demodulator 116, downconverted to baseband and digitized by the receive I-path and Q-path ADCs 38a and 38b of the processor 18.

Figure 12:
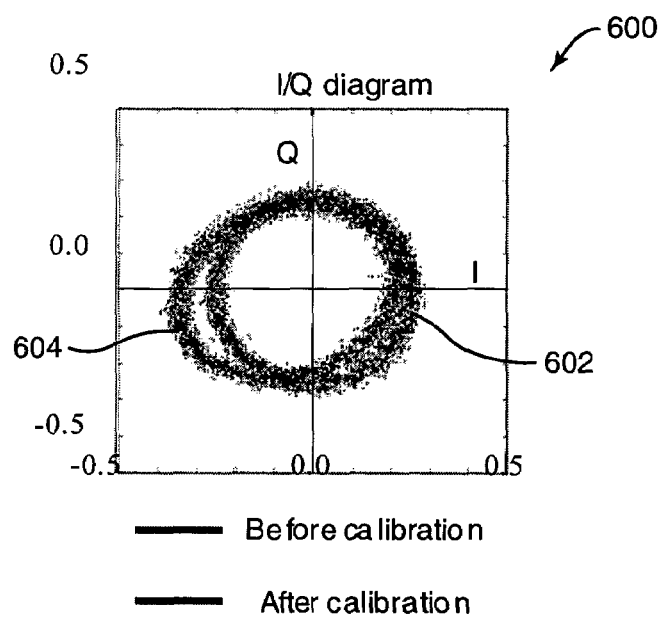
FIG. 12 is a graph illustrating examples of perfect I and Q path matching and the presence of gain and phase mismatch.

Processor 18 analyzes the received signal for receiver I/Q mismatch. A principle of the receiver I/Q mismatch measurement lies in transmitting a constant amplitude signal with rotating phase in the I/Q plane. Once demodulated, if receive I and Q paths are perfectly matched, the demodulated signal appears as a perfect circle, when plotted in I/Q coordinates. However, in the presence of gain and phase mismatch, the demodulated signal appears as an ellipse. By analyzing the properties of this ellipse, the receive I/Q mismatch can be accurately measured. This method is described in greater detail in copending provisional application Ser. No. 60/445, 525, filed Feb. 7, 2003, entitled, "Receiver IQ Phase and Gain Mismatch Digital Calibration," and incorporated herein by reference in its entirety. FIG. 12 is a graph 600 illustrating an example of a circle 602 demonstrating perfect I and Q path matching, and an ellipse 604 demonstrating the presence of gain and phase mismatch.

In other embodiments, other methods can be used to measure the receiver I/Q mismatch. For example, a tone can be sent at the LO frequency plus a small frequency offset, for example 1 MHz. Down-converting the signal for I and Q results in a sinusoid, ideally with same amplitude and 90-degree phase difference. By digitizing the two waveforms, amplitude and phase differences can be measured.

In step 562, the processor 18 determines calibration parameters based on the signal received in step 560 and the analysis of the signal as described above. The calibration parameters are used to minimize I/Q gain and phase mismatch in the receiver 32. The correction block 40 of processor 18 can use these receiver I/Q mismatch calibration parameters during normal, real-time receive operation of the system to adjust received signals before they are processed further by using digital post-distortion so that receiver I/Q mismatch will be minimized. Steps 560 and 562 can be iterated if necessary.

In step 564, it is checked whether I/Q mismatch, is to be calibrated for other channels. Since LO leakage and I/Q mismatch is typically a function of the RF channel frequency, the calibration procedure can be repeated at different RF channels. If the calibrations are to be currently repeated for a different channel, the process continues to step 566 where the channel is changed to a different channel by programming the frequency synthesizer to be tuned at a different RF channel. The process thus returns to step 554 to repeat calibration at the new channel. In any or all of the steps of FIG. 11, the calibration parameters can be stored for later retrieval similarly to the parameters of FIGS. 9 and 10.

If I/Q mismatch calibration is not performed for other RF channels at the present time, the process is complete at 568. It should be noted that the calibrations described in this method can be performed after power up, especially for channels that would not be in initial operation upon power up or at the time when the transceiver changes operation at another channel. Later calibrations are possible for systems that do not have time limitations on how fast they need to change RF channels. If there are such limitations, this calibration is more appropriate when performed at power-up. It is also possible, although not required, to calibrate for I/Q mismatch at different receiver gain settings for receiver I/Q mismatch, and different transmitter gain settings for transmit I/Q mismatch and LO leakage.

Figure 13A:
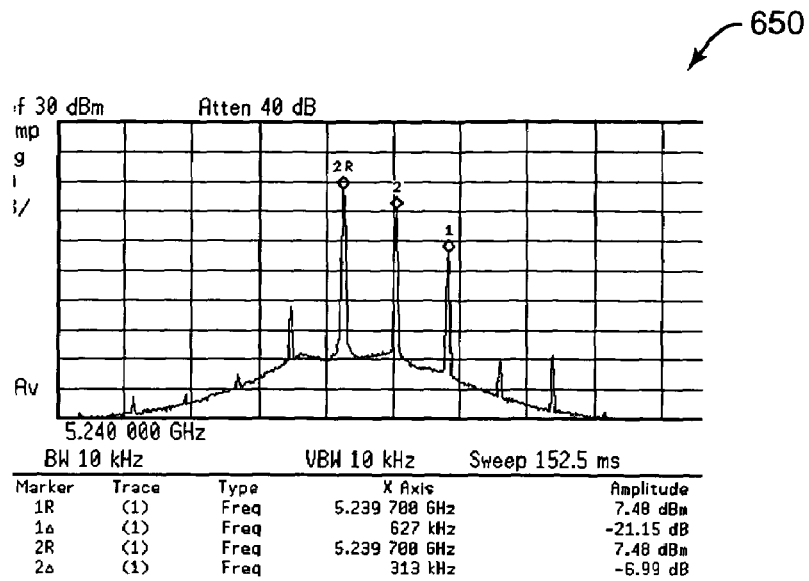
FIGS. 13a and 13b are graphs illustrating the measured frequency spectrum of an upconverted single-sideband tone before and after transmit I/Q mismatch calibration.
Figure 13B:
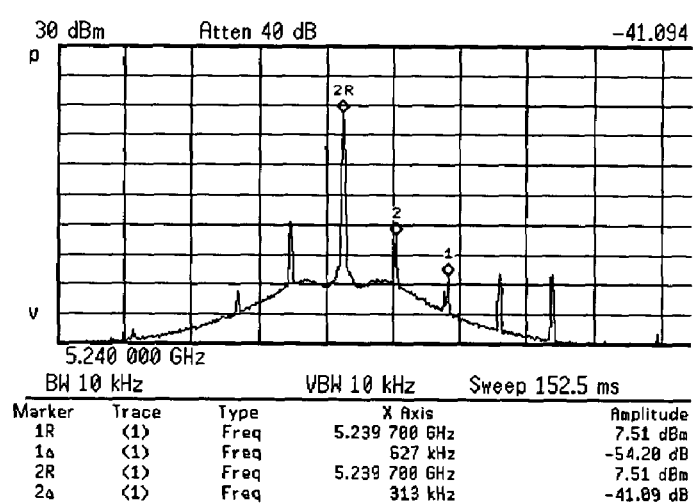

FIGS. 13a and 13b are graphs 650 and 652, respectively, illustrating the measured frequency spectrum of an upconverted single-sideband tone (on the image side) before (in FIG. 13a) and after (in FIG. 13b) transmit I/Q mismatch calibration, which in one example embodiment achieves LO leakage of −41 dBc and unwanted sideband suppression of 54 dB.

Figure 14:
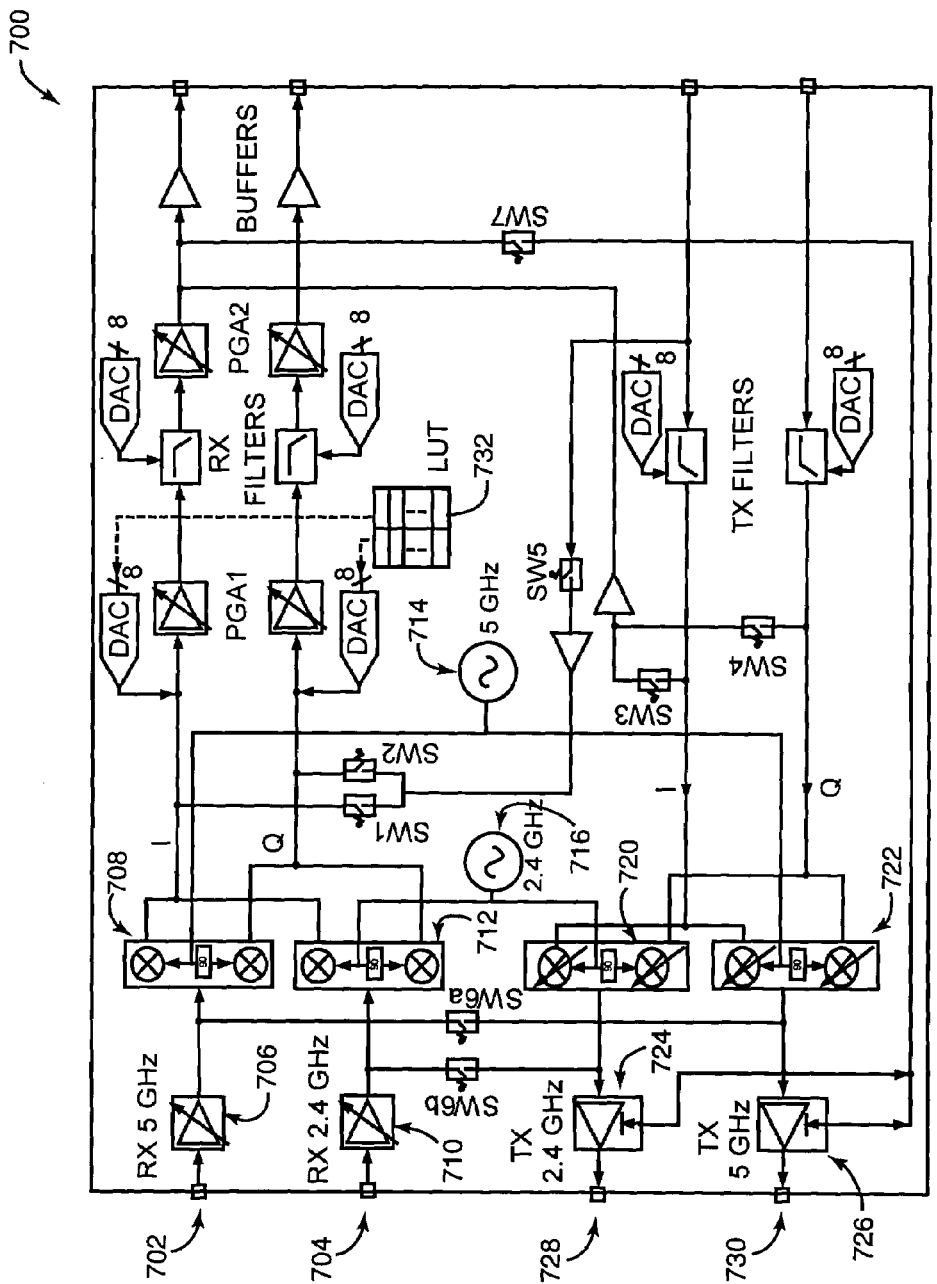
FIG. 14 is a block diagram illustrating an alternate embodiment of a transceiver of the present invention.

FIG. 14 is a block diagram of an alternate embodiment 700 of the transceiver 16 of the present invention, which is a dual-band implementation of the transceiver. In this embodiment, some of the circuitry of the transceiver is duplicated as appropriate to allow for the transmission/reception of other frequency bands. For example, two receiver inputs 702 and 704 are provided, one for a band including 5 GHz and one for a band including 2.4 GHz. The signal can be routed to the appropriate input by a switch similar to transfer switch 14 or by another switch. The 5 GHz RF signal, if input, is sent to an LNA 706 and a quadrature demodulator 708, and then to the remaining components of the receiver path as described in the previous embodiment. The 2.4 GHz RF signal, if input is sent to an LNA 710 and a quadrature demodulator 712, and then to the remaining receiver components. The LO signal for the demodulator 708 is provided by a 5 GHz frequency synthesizer 714, and the LO signal for the demodulator 712 is provided by 2.4 GHz frequency synthesizer 716. Alternatively, one programmable frequency synthesizer can be used to cover both RF bands.

Similarly, on the transmitter side, a signal to be transmitted at 5 GHz is sent to PGM 722 and to amplifier/envelope detector 726 to the output 730. A signal to be transmitted at 2.4 GHz is sent to PGM 720 and to amplifier/envelope detector 724 to the output 728. Look-up table (LUT) 732 can be used to store calibration parameters at different gain and/or channel settings, as described above. SW6 is instead provided as two switches SW6a, to be used for 5 GHz signals, and SW6b, to be used for 2.4 GHz signals. In this dual-and embodiment, the 5 GHz specific components on either transmit or receive operation can be powered down during 2.4 GHz band operation, and vice-versa.

By taking advantage of an innovative architecture utilizing free system computing resources, the present invention can correct direct conversion and CMOS process-related imperfections so that the transceiver of the present invention exceeds standard specifications by a wide margin. The present invention improves the reliability and yield of direct conversion integrated RF transceivers, making CMOS a viable IC process option for state-of the art, cost-effective radios.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A transceiver for transmitting and receiving signals, the transceiver comprising:
   a transmitter operative to up-convert baseband signals from a baseband frequency into RF signals at a radio frequency (RF) frequency and output the RF signals;

a receiver operative to receive RF signals and down-convert the received RF signals into baseband signals having the baseband frequency;

a plurality of calibration paths coupling the transmitter to the receiver, wherein one or more of the calibration paths can be selected to be active when calibrating components of the transceiver using one or more of a plurality of calibration methods, wherein the transceiver is a direct up-conversion and down-conversion architecture, and comprises baseband analog transmit filters having responses which can be measured for calibration using one of the calibration paths, and wherein one of the calibration paths comprises a loopback connection that couples the transmitter to the receiver; and digital-to-analog converters (DACs) coupled to the transmit filters, and controllable to tune the transmit filters based on the measurements of the transmit filters over the calibration path.

2. A transceiver for transmitting and receiving signals, the transceiver comprising:

a transmitter operative to up-convert baseband signals from a baseband frequency into RF signals at an RF frequency and output the RF signals;

a receiver operative to receive RF signals and down-convert the received RF signals into baseband signals having the baseband frequency;

a plurality of calibration paths coupling the transmitter to the receiver, wherein one or more of the calibration paths can be selected to be active when calibrating components of the transceiver using one or more of a plurality of calibration methods;

baseband analog receive filters which have responses which can be measured for calibration using the one of the calibration paths; and digital-to-analog converters (DACs) coupled to the receive filters, and controllable to tune the receive filters based on the measurements of the receive filters over the calibration path.

3. A transceiver for transmitting and receiving signals, the transceiver comprising:

a transmitter operative to up-convert baseband signals from a baseband frequency into RF signals at an RF frequency and output the RF signals;

a receiver operative to receive RF signals and down-convert the received RF signals into baseband signals having the baseband frequency; and a plurality of calibration paths coupling the transmitter to the receiver, wherein one or more of the calibration paths can be selected to be active when calibrating components of the transceiver using one or more of a plurality of calibration methods, wherein the selected calibration path is selected to be active by a processor coupled to the transceiver and which controls the calibrations of the components of the transceiver, and wherein one of the calibration paths comprises a loopback connection connected from the RF output of the transmitter to the processor controlling the calibrations, wherein the loopback connection includes an envelope detector to allow transmit I/Q mismatch to be measured by the processor.

4. The transceiver of claim 3, wherein the loopback connection is active only when the I/Q mismatch measurement is occurring.

5. The transceiver of claim 3, wherein the loopback connection and envelope detector allow estimation of leakage of a local oscillator (LO) included in the transceiver.

6. The transceiver of claim 5, wherein the estimated LO leakage is compensated in signals that are transmitted by the transmitter by using digital pre-distortion.

7. The transceiver of claim 3, wherein the measured transmit I/Q mismatch is removed from signals that are transmitted by the transmitter by using digital pre-distortion.

8. A transceiver for transmitting and receiving signals, the transceiver comprising:

a transmitter operative to up-convert baseband signals from a baseband frequency into RF signals at an RF frequency and output the RF signals;

a receiver operative to receive RF signals and down-convert the received RF signals into baseband signals having the baseband frequency; and a plurality of calibration paths coupling the transmitter to the receiver, wherein one or more of the calibration paths can be selected to be active when calibrating components of the transceiver using one or more of a plurality of calibration methods, wherein the selected calibration path is selected to be active by a processor coupled to the transceiver and which controls the calibrations of the components of the transceiver, wherein one of the calibration paths comprises a loopback connection connected from the RF output of the transmitter to the input of the receiver, wherein the loopback connection allows receive I/Q mismatch to be measured by the processor, wherein the processor provides a calibration signal to the transmitter to measure the receive I/Q mismatch, wherein the calibration signal is digitally pre-distorted by the processor to remove transmit I/Q mismatch.

9. A transceiver for transmitting and receiving signals, the transceiver comprising:

a transmitter operative to up-convert baseband signals from a baseband frequency into RF signals at an RF frequency and output the RF signals;

a receiver operative to receive RF signals and down-convert the received RF signals into baseband signals having the baseband frequency; and a plurality of calibration paths coupling the transmitter to the receiver, wherein one or more of the calibration paths can be selected to be active when calibrating components of the transceiver using one or more of a plurality of calibration methods, wherein the receiver comprises a plurality of digital-to-analog converters (DACs) which are controllable to remove baseband path DC offset independently for I and Q paths of the receiver.

10. A method for implementing a transceiver for transmitting and receiving signals, the method comprising:

calibrating components of the transceiver by using a plurality of calibration paths of the transceiver, wherein one or more of the calibration paths can be selected to be active when calibrating associated components of the transceiver, and to be inactive when not calibrating the associated components, and wherein the calibrating uses one or more of a plurality of calibration methods;

transmitting RF signals with a transmitter by up-converting baseband signals having a baseband frequency into the received RF signals and outputting the RF signals; and receiving RF signals with a receiver and down-converting the RF signals into baseband signals having the baseband frequency, wherein the calibration of components comprises selecting the one or more calibration paths to be active by a processor coupled to the transceiver and which controls the calibrations of the components of the transceiver, wherein the calibration of components comprises measuring transmit I/Q mismatch using the one or more calibration paths that includes a loopback connection connecting the transmitter to the processor controlling the calibrations, wherein the measuring of transmit I/Q mismatch comprises providing a calibration signal and detecting an envelope of the calibration signal at the output of the transmitter, wherein the calibration of components comprises estimating the leakage of a local oscillator (LO) included in the transceiver, and wherein LO leakage is estimated from the detected envelope of the calibration signal.

11. The method of claim 10, wherein the calibration of components comprises compensating for the LO leakage in signals that are to be transmitted by the transmitter by using digital pre-distortion.

12. A method for implementing a transceiver for transmitting and receiving signals, the method comprising:
   calibrating components of the transceiver by using a plurality of calibration paths of the transceiver, wherein one or more of the calibration paths can be selected to be active when calibrating associated components of the transceiver, and to be inactive when not calibrating the associated components, and wherein the calibrating uses one or more of a plurality of calibration methods;
   transmitting RF signals with a transmitter by up-converting baseband signals having a baseband frequency into the RF signals and outputting the RF signals; and
   receiving RF signals with a receiver and down-converting the RF signals into baseband signals having the baseband frequency,
   wherein the calibration of components comprises removing baseband path DC offset independently for I and Q paths of the receiver.

13. The method of claim 12, wherein the removing of DC offset comprises providing analog correction signals to adjust the voltage added at the output of a demodulator of the transceiver using a plurality of digital-to-analog converters (DACs).

14. A method for calibrating a transceiver, the method comprising:
   selecting one or more of a plurality of available calibration paths on the transceiver to be active, wherein the transceiver comprises a transmitter and a receiver, and wherein at least one of the plurality of available calibration paths couples the transmitter to the receiver;
   providing a calibration signal to the transceiver via the selected one or more calibration paths;
   receiving the calibration signal after it has passed through the selected one or more calibration paths; and
   measuring characteristics of the transceiver using the received calibration signal, wherein the measured characteristics are used in the calibration of the transceiver, wherein the calibration uses one or more of a plurality of calibration methods,
   wherein the selected one or more calibration paths connects the output of the transmitter on the transceiver to an envelope detector, and wherein the selected one or more calibration paths is used to calibrate transmit I/Q mismatch and local oscillator leakage.

\* \* \* \* \*